United States Patent
Ishiguro et al.

(10) Patent No.: US 7,443,984 B2
(45) Date of Patent: Oct. 28, 2008

(54) INFORMATION PROCESSING SYSTEM AND METHOD FOR DISTRIBUTING ENCRYPTED MESSAGE DATA

(75) Inventors: Ryuji Ishiguro, Tokyo (JP); Yoshitomo Osawa, Kanagawa (JP); Tateo Oishi, Saitama (JP); Tomoyuki Asano, Kanagawa (JP); Atsushi Mitsuzawa, Tokyo (JP)

(73) Assignee: Sony Corporation (JP)

( * ) Notice: Subject to any disclaimer, the term of this patent is extended or adjusted under 35 U.S.C. 154(b) by 1059 days.

(21) Appl. No.: 10/009,076

(22) PCT Filed: Apr. 2, 2001

(86) PCT No.: PCT/JP01/02866

§ 371 (c)(1),
(2), (4) Date: Apr. 15, 2002

(87) PCT Pub. No.: WO01/78298

PCT Pub. Date: Oct. 18, 2001

(65) Prior Publication Data

US 2002/0136411 A1 Sep. 26, 2002

(30) Foreign Application Priority Data

Apr. 6, 2000 (JP) ............................. 2000-105329
Jun. 15, 2000 (JP) ............................. 2000-179695

(51) Int. Cl.
*H04L 9/00* (2006.01)
(52) U.S. Cl. ...................................... 380/278; 380/280
(58) Field of Classification Search ................. 380/278, 380/280
See application file for complete search history.

(56) References Cited

U.S. PATENT DOCUMENTS 4,227,253 A 10/1980 Ehrsam et al.

(Continued)

FOREIGN PATENT DOCUMENTS

DE 195 11 298 A1 10/1996

(Continued)

OTHER PUBLICATIONS

JP 11-187013-A Machine-Assisted Translation, Feb. 3, 2006, Thompson, pp. 1-30.*

(Continued)

*Primary Examiner*—Kambiz Zand
*Assistant Examiner*—Jacob Lipman
(74) *Attorney, Agent, or Firm*—Lerner, David, Littenberg, Krumholz & Mentlik, LLP

(57) ABSTRACT

A content key, an authentication key, and a program data etc. are transmitted with an enabling key block (EKB) in an encrypted key constitution of a tree structure. The EKB has a constitution in which a device as a leaf of the tree holds a leaf key and a limited node key, and a specific enabling key block (EKB) is generated and distributed to a group specified by a specific node to limit devices that can be renewed. As the devices that do not belong to the group cannot perform decryption, the security for distributing keys etc. can be secured. Thus, distribution of various kinds of keys or data is executed in an encryption key constitution of a tree structure to realize an information processing system and method enabling to distribute data efficiently and safely.

29 Claims, 23 Drawing Sheets

U.S. PATENT DOCUMENTS

| | | |
|---|---|---|
| 4,611,272 A | 9/1986 | Lomet |
| 4,933,969 A | 6/1990 | Marshall et al. |
| 4,969,188 A | 11/1990 | Schobi et al. |
| 5,200,999 A | 4/1993 | Matyas et al. |
| 5,396,614 A | 3/1995 | Khalidi et al. |
| 5,432,852 A | 7/1995 | Leighton et al. |
| 5,584,022 A | 12/1996 | Kikuchi et al. |
| 5,606,617 A | 2/1997 | Brands et al. |
| 5,721,781 A | 2/1998 | Deo et al. |
| 5,748,736 A | 5/1998 | Mittra |
| 6,044,155 A | 3/2000 | Thomlinson et al. |
| 6,049,878 A | 4/2000 | Caronni et al. |
| 6,088,454 A | 7/2000 | Nagashima et al. |
| 6,128,263 A | 10/2000 | Fujii et al. |
| 6,240,188 B1 | 5/2001 | Dondeti et al. |
| 6,289,102 B1 | 9/2001 | Ueda et al. |
| 6,367,019 B1 | 4/2002 | Ansell et al. |
| 6,522,607 B1 | 2/2003 | Ishibashi et al. |
| 6,574,609 B1 | 6/2003 | Downs et al. |
| 6,609,116 B1 | 8/2003 | Lotspiech |
| 6,636,968 B1 | 10/2003 | Rosner et al. |
| 6,850,914 B1 | 2/2005 | Harada et al. |
| 6,886,098 B1 | 4/2005 | Benaloh |
| 7,013,389 B1 | 3/2006 | Srivastava et al. |
| 7,043,024 B1 | 5/2006 | Dinsmore et al. |
| 7,065,648 B1 | 6/2006 | Kamibayashi et al. |
| 2001/0021255 A1 | 9/2001 | Ishibashi |

FOREIGN PATENT DOCUMENTS

| | | |
|---|---|---|
| EP | 0 107 448 A2 | 5/1984 |
| EP | 0 994 475 A1 | 4/2000 |
| EP | 1051036 | 11/2000 |
| JP | 07-230412 A1 | 8/1995 |
| JP | 11-102572 A1 | 4/1999 |
| JP | 11-187013 A | 7/1999 |
| JP | 11-187013 A1 | 7/1999 |
| JP | 11-195269 A1 | 7/1999 |
| JP | 11-250568 A | 9/1999 |
| JP | 11-250568 A1 | 9/1999 |
| JP | 2000-113587 A | 4/2000 |
| JP | 2000-298942 A1 | 10/2000 |
| WO | WO-00/52690 A1 | 9/2000 |
| WO | WO-01/03364 A1 | 1/2001 |
| WO | WO-01/03365 A1 | 1/2001 |

OTHER PUBLICATIONS

Waldvogel, M., et al., "The VersaKey Framework: Versatile Group Key Management", IEEE Journal on Selected Areas in Communications, vol. 17, No. 9, pp. 1614 to 1631, Sep. 1999, pp. 1616, right col. to p. 1621, left col.

Wong, C. K. et al., "Secure Group Communications Using Key Graphs" Proceedings of ACM SIGCOMM'98, pp. 68 to 79, Sep. 2, 1998, 3.4 Leaving a tree key graph (http://www.acm.org/sigcomm/sigcomm98/tp/technical.html).

Nakano, et al., "Key Management System for Digital Content Protection", 2001 Symposium on Cryptography and Information Security, Oiso, Japan, pp. 213-218, Jan. 23, 2001.

Wallner, D. et al., "Key Management for Multicast: Issues and Architectures", IETF Request for Comments, The Internet Society, Jun. 1999, pp. 1-23.

* cited by examiner

| VERSION : t | |
|---|---|
| INDEX | ENCRYPTED KEY |
| 0 | Enc(K(t)0, K(t)R) |
| 00 | Enc(K(t)00, K(t)0) |
| 000 | Enc(K000, K(t)00) |
| 001 | Enc(K(t)001, K(t)00) |
| 0010 | Enc(K0010, K(t)001) |

FIG.4A

| VERSION : t | |
|---|---|
| INDEX | ENCRYPTED KEY |
| 000 | Enc(K000, K(t)00) |
| 001 | Enc(K(t)001, K(t)00) |
| 0010 | Enc(K0010, K(t)001) |

FIG.4B

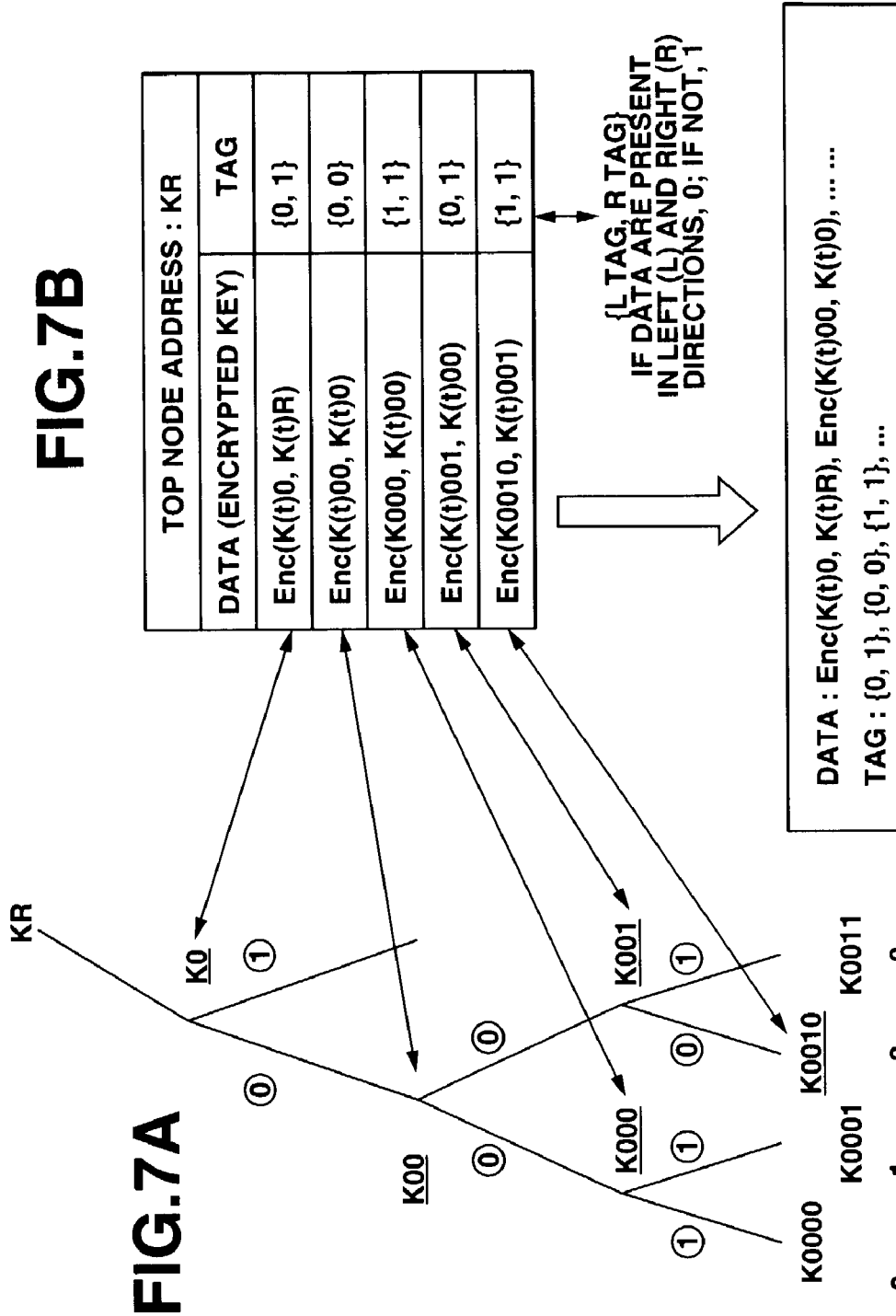

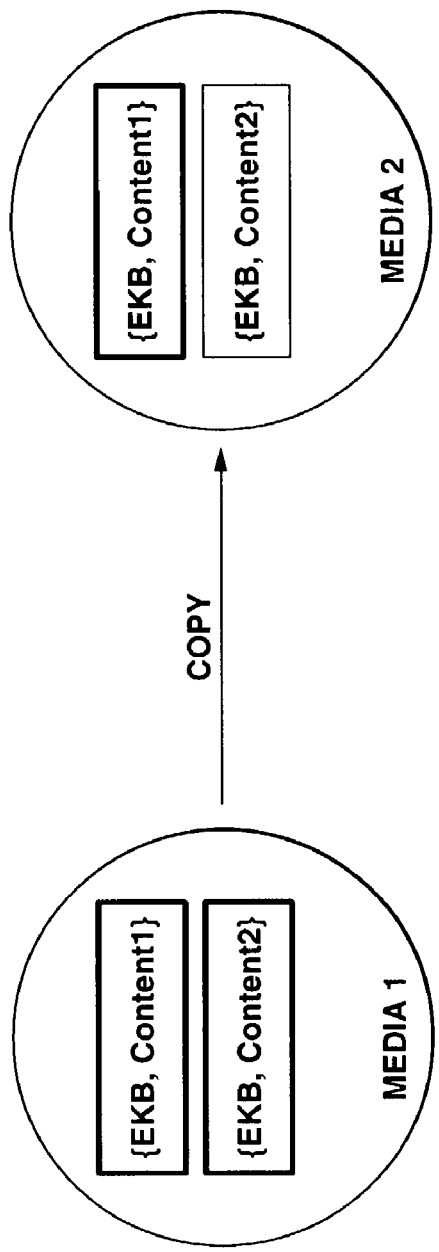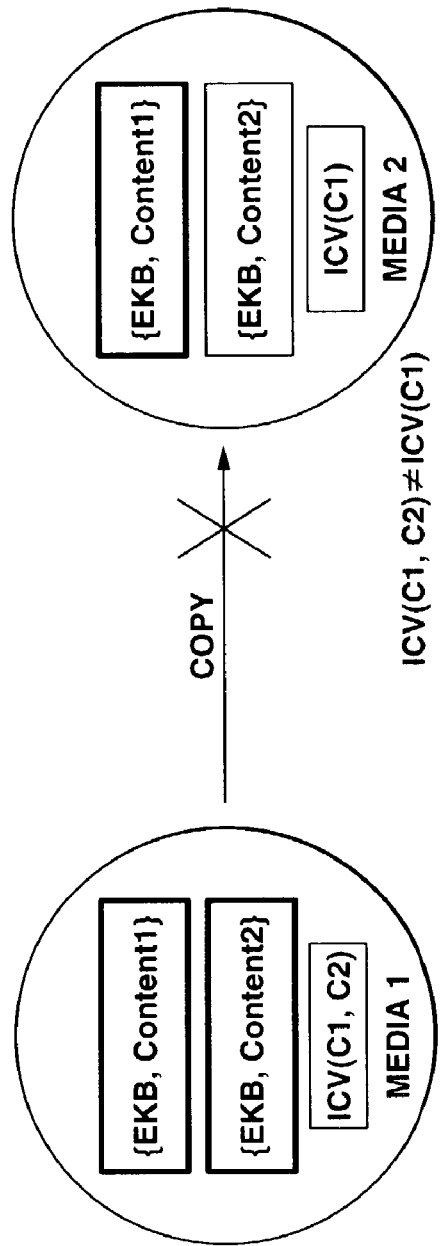
FIG.21A
FIG.21B

INFORMATION PROCESSING SYSTEM AND METHOD FOR DISTRIBUTING ENCRYPTED MESSAGE DATA

CROSS-REFERENCE TO RELATED APPLICATIONS

The present application is a national stage application under 35 U.S.C. §371 of International Application No. PCT/JP01/02866, filed Apr. 2, 2001, which claims priority from Japanese Application No. P2000-105329, filed Apr. 6, 2000, and from Japanese Application No. P2000-179695, filed Jun. 15, 2000, the disclosures of which are incorporated herein by reference.

BACKGROUND OF THE INVENTION

1. Technical Field

The present invention relates to an information processing system, an information processing method, an information recording medium, and a program distributing medium, and particularly, to a system and a method for distributing an encryption processing key in a system involving an encryption processing. Particularly, the invention relates to an information processing system, an information processing method, an information recording medium, and a program distributing medium, which uses a tree-structured hierarchical key distributing system, to thereby reduce a message quantity, relieves loads of a content key distribution or data distribution when various keys are renewed, and can hold safety of data.

2. Background Art

Recently, various software data (which will be hereinafter called contents) such as game programs, voice data, image data, and so on have been actively circulated through a network such as an internet, or storage media capable of being circulated such as DVD, CD, etc. These circulation contents are reproduced by reception of data by a PC (Personal Computer) owned by a user or game apparatus, or by mounting a memory medium, or are stored in a recording device within a recording and reproducing apparatus attached to PC and the like, for example, a memory card, a hard disk and the like, the contents being utilized by new reproducing from the stored medium.

Information apparatuses such as a video game apparatus, PC and the like have an interface for receiving the circulation contents from a network or for getting access to DVD, CD and the like, and further have control means necessary for reproducing the contents, and RAM, ROM and the like used as a memory region for programs and data.

Various contents such as music data, image data, or programs are called from a memory medium by user's instructions from the information apparatus such as a game apparatus, PC and the like used as a reproducing apparatus or user's instructions through input means connected, and are reproduced though information apparatus or a display, a speaker and the like connected.

Many software contents such as game programs, music data, image data and the like are generally held in their distribution rights by owners and sales agents. Accordingly, in distribution of these contents, there is a predetermined using limitation, that is, the use of software is granted to only proper users so that reproduction without permission is not made. That is, generally, the constitution taking security into consideration is employed.

One procedure for realizing the limit of use to users is an encryption processing of distributed contents. Namely, for example, various contents such as voice data, image data, game programs and the like encrypted through an internet or the like are distributed, and means for decrypting the encrypted contents distributed, that is, a decryption key is given to only persons confirmed to be a proper user.

Encrypted data can be returned to decrypted data that can be used by decrypting processing in accordance with the predetermined procedure. Data encrypting using a decryption key for decrypting processing, and a decrypting method, using an encrypted key for encryption processing of information as described have been heretofore well known.

There are a variety of kinds of forms of data encrypting and decrypting method using an encryption key and a decryption key, but there is, as one example therefor, a system called a so-called common key encryption system. In the common key encryption system, with an encryption key used for encrypting processing for data and a decryption key used for decrypting data made to be common, a common key used for these encrypting processing and decrypting is given to a proper user so as to eliminate the data access by an invalid user. As a typical system of the system as described, there is DES (Data Encryption Standard).

The encryption key and the decryption key used for the encrypting processing and decrypting as described above can be obtained by applying a unidirectional function such as a hash function on the basis of a pass-word or the like, for example. The unidirectional function herein termed is a function which is very difficult to obtain an input conversely from an output. For example, the unidirectional function is applied with a pass-word determined by a user as an input, and the encryption key and the decryption key are produced on the basis of the output. It is substantially impossible, from the encryption key and the decryption key thus obtained, to conversely obtain a pass-word which is an original datum thereof.

A system making processing by an encryption key used for encryption and processing by a decryption key used for decrypting different algorithm is a system so-called a public key encryption system. The public key encryption system is a method using a public key that can be used by an unspecific user, in which with respect to an encrypted document for a specific individual, encrypting processing is carried out using a public key issued by the specific individual. The document encrypted by the public key can be subjected to decrypting processing merely by a private key corresponding to the public key used for the encrypting processing. The private key is owned merely by the individual who issued the public key, and the document encrypted by the public key can be decrypted merely by the individual having the private key. A typical public key encryption system is a RSA (Rivest-Shamir-Adleman) encryption. By making use of such an encryption system, there can be provided a system for enabling decrypting encrypted contents merelyfor a proper user.

In the content distributing system as described above employs many constitutions in which contents are encrypted and stored in the recording media such as a network, or DVD, CD and the like to provide them for users, and to provide a content key for decrypting encrypted contents for only a proper user. There is proposed a constitution in which a content key for preventing invalid copies of the content key itself is encrypted to provide it to a proper user, and an encrypted content key is decrypted using a decryption key owned by only the proper user to enable using the content key.

The judgment whether or not a user is proper is generally carried out by executing authenticating processing before distribution of contents or content keys, for example, between a content provider who is a transmitter of contents and a user's device. In general authenticating processing, confirmation is made of a mating party, and a session key effective only for communication is produced. When authentication is established, data, for example, contents or a content key is encrypted using the produced session key for communication. The authenticating system includes mutual authentication using a common key encryption system, and an authentication system using a public key system. In the authentication using a common key, a common key in the system wide is necessary, which is inconvenient at the time of renewal processing. Further, in the public key system, computation load is large and necessary memory quantity increases, and the provision of such a processing means on each device is not a desirable constitution.

DISCLOSURE OF THE INVENTION

It is an object of the present invention to provide an information processing system, an information processing method, an information recording medium, and a program distributing medium, which enables transmission of data safely to a proper user without relying on mutual authentication processing between a transmitter and a receiver of data as described above.

An information processing system according to the present invention is one for distributing encrypted message data capable of being used only in not less than one device selected, the individual device comprising: encryption processing means for holding a different key set of a node key peculiar to each node in a hierarchical tree structure with a plurality of different devices as leaves and a leaf key peculiar to each device and executing decrypting process on the encrypted message data distributed to a device using the key set; wherein a message data distributing means generates a renewal node key into which at least one of the node keys in a group constituted by nodes and leaves connected at subordinate of a top node which is one node of the hierarchical tree structure is renewed and an enabling key block (EKB) into which the renewal node key is encrypted with a node key or a leaf key in the group, and generating and distributing a message data encrypted with the renewal node key.

Further, in one embodiment of the information processing system according to the present invention, the encryption processing means in the device obtains the renewal node key by the processing of the enabling key block (EKB) and executing decrypting of the encrypted message data by the renewal node key obtained.

Further, in one embodiment of the information processing system according to the present invention, the message data is a content key that can be used as a decryption key for decrypting content data.

Further, in one embodiment of the information processing system according to the present inventions the message data is an authentication key used in the authentication processing.

Further, in one embodiment of the information processing system according to the present invention, the message data is a key for genereateing an integritycheck value (ICV) of the content.

Further, in one embodiment of the information processing system according to the present invention, the message data is an authentication key used in the authentication processing.

Further, in one embodiment of the information processing system according to the present invention, the message data is a program code.

Further, in one embodiment of the information processing system according to the present invention, the message data distributing means distributes the enabling key block (EKB) and an encrypted data comprising a content key usable as a decryption key for decrypting content data as the message data and an encrypted content encrypted by the content key.

Further, in one embodiment of the information processing system according to the present invention, the message data distributing means and the device respectively have an authentication processing means for executing authentication processing, and wherein a distribution of the message data is performed on the condition that authentication processing between the message data distributing means and the device has been completed.

Further, in one embodiment of the information processing system according to the present invention, there exists a different intermediate device between the message data distributing means and the device, and wherein the message data distributing means generates and distributing an enabling key block (EKB) and an encrypted message data that can be decrypted only in target devices targeted for distributing the message data.

Further, in one embodiment of the information processing system according to the present invention, the hierarchy tree structure includes a category group constituted as a group, with one node as a top node, containing nodes and leaves connected at subordinate of the top node; wherein the category group is constructed as a set of devices that belong to a category defined solely by a kind of a device, a kind of a service or a kind of a managing means.

Further, in one embodiment of the information processing system according to the present invention, the category group further includes one or more sub-category groups in the lower stage of the hierarchy tree structure; wherein the sub-category group is constructed as a set of groups that belong to a category defined solely by a kind of a device, a kind of a service, a kind of a managing means.

An information processing method according to the present invention is one for distributing from a message data distributing, means encrypted message data capable of being used only in not less than one device selected, comprising: a message data distributing step of generating a renewal node key into which at least one of the node keys in a group constituted by nodes and leaves connected at subordinate of a top node which is one node of the hierarchical tree structure having a plurality of different devices as leaves is, renewed, theand an enabling key block (EKB) into which the renewal node key is encrypted with a node key or a leaf key in the group, and generating and distributing a message data encrypted by the renewal node key; and a decrypting processing step of executing decrypting processing on the encrypted message data by using a key set in each device holding the different key set of a node key peculiar to each node in the hierarchical tree structure and a leaf key peculiar to each device.

Further, in one embodiment of the information processing method according to the present invention, the decrypting processing step includes a renewal node key obtaining step of obtaining the renewal node key by processing of the enabling key block (EKB); and a message data decrypting step for executing decryption of the encrypted message data by the renewal node key.

Further, in one embodiment of the information processing method according to the present invention, the message data is a content key capable of being used as a decryption key for decrypting the content data.

Further, in one embodiment of the information processing method according to the present invention, the message data is an authentication key used in the authentication processing.

Further, in one embodiment of the information processing method according to the present invention, the message data is a key of generating an integrity check value (ICV) of contents.

Further, in one embodiment of the information processing method according to the present invention, the message data is an authentication key used in the authentication processing.

Further, in one embodiment of the information processing method according to the present invention, the message data is a program code.

Further, in one embodiment of the information processing method according to the present invention, the message data distributing means distributes the enabling key block (EKB) and an encrypted data comprising a content key usable as a decryption key for decrypting content data as the message data and an encrypted content encrypted by the content key.

Further, in one embodiment of the information processing method according to the present invention, the message data distributing means and the device respectively have an authentication processing means for executing authentication processing, and wherein a distribution of the message data is performed on the condition that authentication processing between the message data distributing means and the device has been completed.

Further, in one embodiment of the information processing method according to the present invention, there exists a different intermediate device between the message data distributing means and the device, and wherein the message data distributing means generates and distributes an enabling key block (EKB) and an encrypted message data that can be decrypted only in a target device targeted for distributing the message data.

An information recording medium according to the present invention is one having stored therein data, and stores a renewal node key into which at least one of the node keys in a group constituted by nodes and leaves connected at subordinate of the top node which is one node of the hierarchical tree structure having a plurality of different devices as leaves is renewed and an enabling key block (EKB) into which the renewal node key is encrypted by a node key or a leaf key in the group; and a message data encrypted by the renewal node key.

Further, in one embodiment of the information recording medium according to the present invention, the message data is a content key used for decrypting contents. The information recording medium stores an encrypted content encrypted by the renewal node key.

Further, in one embodiment of the information recording medium according to the present invention, the information recording medium stores correspondence data for relating a content with an enabling key block (EKB) used for obtaining a content key corresponding to the content.

Further, in one embodiment of the information recording medium according to the present invention, the information recording medium stores an integrity check value (ICV) of contents.

A program providing medium according to the present invention is one for. executing decrypting process of encrypted content data on a computer system, the computer program comprising: a renewal node key obtaining step of obtaining a renewal node key by decrypting process of an enabling key block (EKB) into which the renewal node key into which at least one of the node keys in a group constituted by nodes and a leaf connected at subordinate of the top node which is one node of the hierarchical tree structure having a plurality of different devices as leaves is renewed is encrypted with a node key or a leaf key in a group on a renewal node key; a step of executing decrypting process by the renewal node key to obtain a content key used as a decryption key for the encrypted content; and a step of executing decryption of the encrypted content by the content key.

In the constitution of the present invention, the encryption key distributing constitution of the hierarchical structure of the tree structure is used to suppress the distributing message quantity necessary for key renewal as small as possible. That is, the key distribution method in which each apparatuses is arranged in each leaf by n-division is used whereby for example, a content key which is a encryption key of content data or an authentication key used in authentication processing or a program code are distributed along with an enabling key block through recording medium or a communication circuit. According to the present constitution, only the. proper device is able to distribute decodable data safely.

It is noted that the program distributing medium according to the present invention is a medium for distributing a computer program in the form that can be read by a computer to a general computer system capable of executing for example, various program codes. The medium includes recording media such as CD, FD, MO, etc., or a transfer medium such as a network, whose form is not particularly limited.

Such a program distributing medium defines a cooperative relationship in terms of construction or function between a computer program and a distributing medium in order to realize a function of a predetermined computer program in a computer system. In other words, a computer program is installed in a computer system through the distributing medium to exhibit the cooperative operation in the computer system to obtain the operation and effect similar to another aspects.

The other objects, features and advantages of the present invention will be apparent from the detailed description with reference to the embodiments and the accompanying drawings of the present invention.

BRIEF DESCRIPTION OF THE DRAWINGS

FIGS. 4A and 4B are views each showing an example of an enabling key block (EKB) used in distribution of various keys and data in the information processing system according to the present invention.

FIGS. 7A to 7C are views each for explaining a constitution of a tag of an enabling key block (EKB) in the information processing system according to the present invention.

FIGS. 21A and 21B are views each for explaining a copy preventive function where an applicable content integrity check value (ICV) is stored in a medium in the present invention.

DETAILED DESCRIPTION

[Outline of System]

Figure 1:
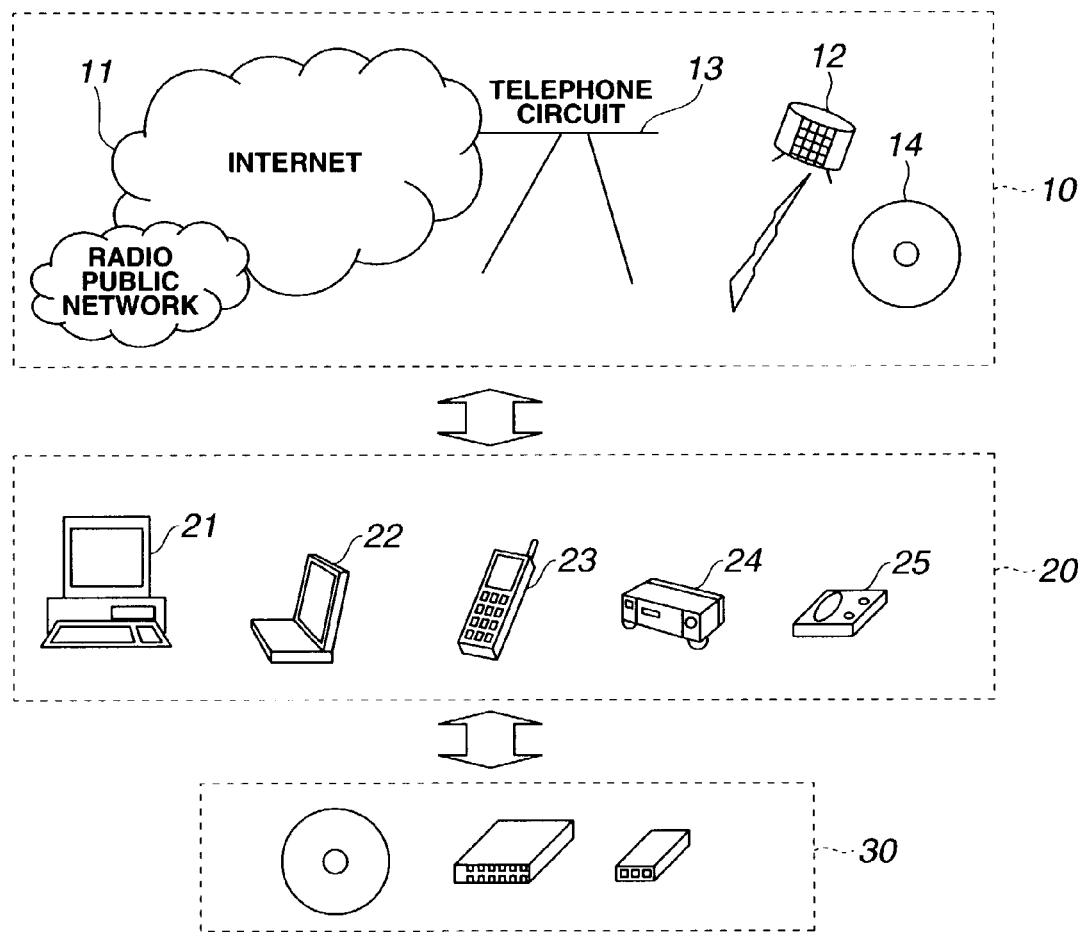
FIG. 1 is a view for explaining an example of constitution of an information processing system according to the present invention.

FIG. 1 shows an example of a content distributing system to which the data processing system of the present invention can be applied. The content distributing side 10 transmits a content or a content key encrypted to various content reproducible apparatuses on the content receiving side 20. The apparatus on the content receiving side 20 decrypts an encrypted content or a content key received to obtain a content or a content key, and carries out reproduction of image data and voice data or execution of various programs. The exchange of data between the content distributing side 10 and the content receiving side 20 is executed through a network such as an internet or through a circulatable recording medium such as DVD, CD.

The data distributing means on the content distributing side 10 includes an internet 11, a satellite broadcasting 12, a telephone circuit 13, media 14 such as DVD, CD, etc., and on the other band, the devices on the content receiving side 20 include a personal computer (PC) portable apparatuses 23 such as a portable device (PD), a portable telephone, PDA (Personal Digital Assistants), etc., a recording and reproducing unit 24 such as DVD, CD players, and a reproduction exclusive-use unit 25 such as a game terminal. In these devices on the content receiving side 20, contents distributed from the content distributing side 10 are obtained from communication means such as a network, or from a media 30.

[Constitution of Device]

Figure 2:
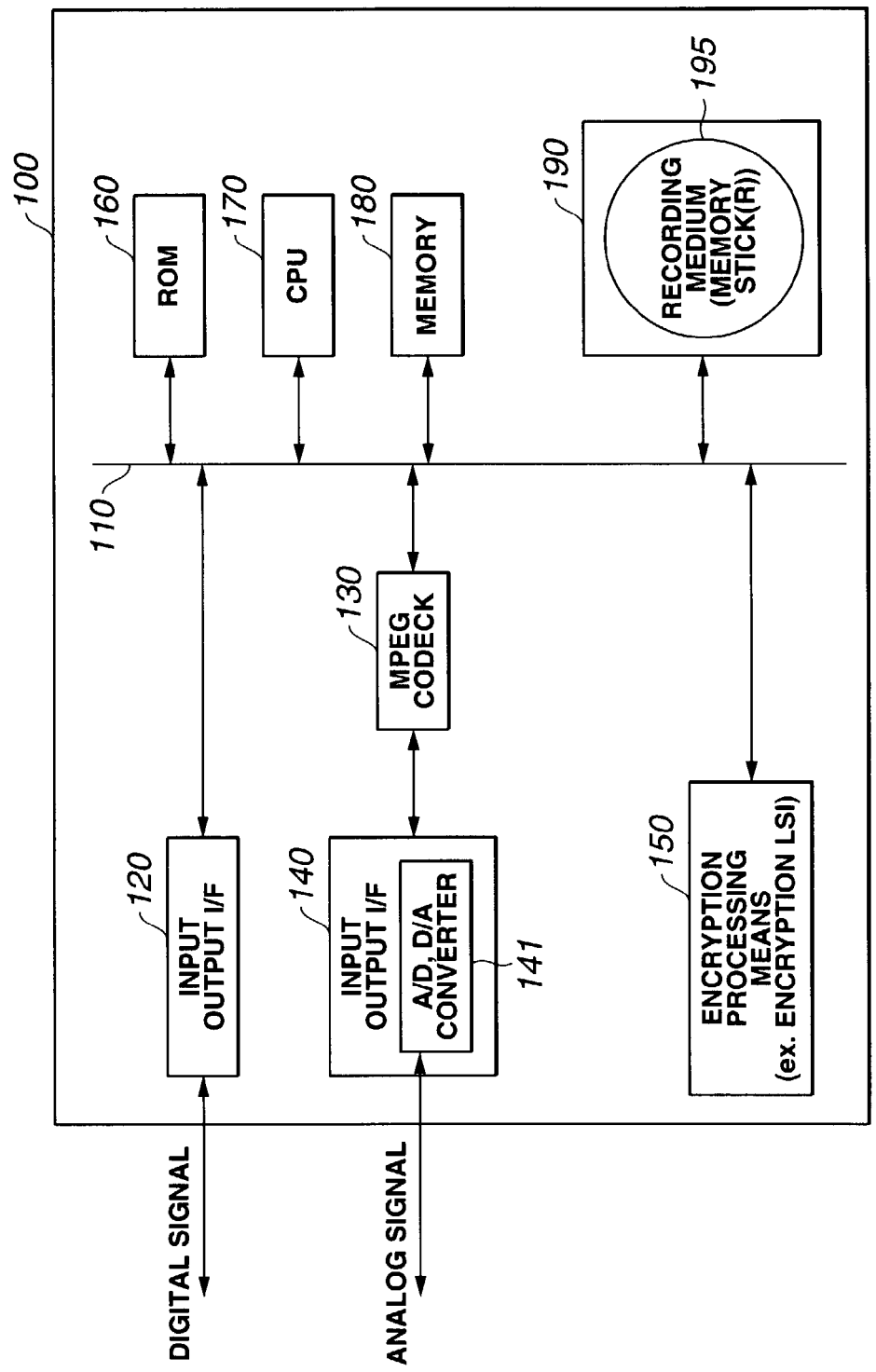
FIG. 2 is a block diagram showing an example of constitution of a recording. and reproducing apparatus that can be applied in the information processing system according to the present invention.

FIG. 2 shows a block diagram of a recording and reproducing device 100 as one example of devices on the content receiving side 20 shown in FIG. 1. The recording and reproducing device 100 has an input/output I/F (Interface) 120, a MPEG (Moving Picture Experts Group) codec 130, an I/F (Interface) 140 provided with A/D, D/A converter 141, an encryption processing means 150, ROM (Read Only Memory) 160, CPU (Central Processing Unit) 170, a memory 180, and a drive 190 for a recording medium 195, which are connected to each other by a bus 110.

The input/output I/F 120 receives a digital signal constituting various contents such as an image, voice, a program, etc. supplied from the outside to output it to the bus 110, and receives a digital signal of the bus 110 to output it to the outside. The MPEG codec 130 decrypts MPEG coded data supplied through the bus 110 to output it to the input/output I/F 140, and MPEG-decrypts a digital signal supplied from the input/output I/F 140 to output it to the bus 110. The input/output I/F 140 contains an A/D, D/A converter 141 therein. The input/output I/F 140 receives an analog signal as a content supplied from the outside, which is subjected to A/D (Analog Digital) conversion by the A/D, D/A converter 141 whereby the signal is output as a digital signal to the MPEG codec 130, and a digital signal from the MPEG codec 130 is subjected to D/A (Digital Analog) conversion by the A/D, D/A converter 141, which is output as an analog signal to the outside.

The encryption processing means 150 is constituted form, for example, one chip LSI (Large Scale Integrated circuit), to execute encrypting, decrypting processing or authentication processing of a digital signal as a content supplied through the bus 110, and output encrypted data and decrypted data to the bus. 110. The encryption processing means 150 can be also realized by not only the one chip LSI but by a combination of various soft wares or hard wares. The constitution of the processing means formed from the software configuration will be described later.

ROM 160 stores program data processed by the recording and reproducing device. The CPU 170 executes programs stored in the ROM 160 and the memory 180 to thereby control the MPEG codec 130 and the encryption processing means 150. The memory 180 is for example, a non-volatile memory, which stores a program that is executed by the CPU 170, data necessary for operation of CPU 170, and a key set used in the encryption processing executed by the device. The key set will be explained later. The drive 190 drives the recoding medium 195 capable of recording and reproducing digital data to thereby read (reproduce) digital data from the recording medium 195 to output it to the bus 110, and supplies digital data supplied through the bus 110 to the recording medium 195 for recording.

The recording medium 195 is a medium capable of storing digital data, for example, an optical disk such as DVD, CD, an optical magnetic disk, a magnetic. disk, a magnetic tape, or a semiconductor memory such as RAM, and in the present embodiment, the medium can be detachably mounted on the drive 190. However, the recording medium 195 may be housed in the recording and reproducing device 100.

The encryption processing means 150 shown in FIG. 2 may be constituted as a single one-chip LSI, and may employ a constitution that is realized by a combination of a software and a hardware.

[Tree Structure as a Key Distributing Constitution]

Next, the constitution for holding an encryption processing key in each device and a data distributing constitution where encrypted data are distributed from the content distributing side 10 shown in FIG. 1 to each device on the content receiving side 20 will be described using FIG. 3.

Figure 3:
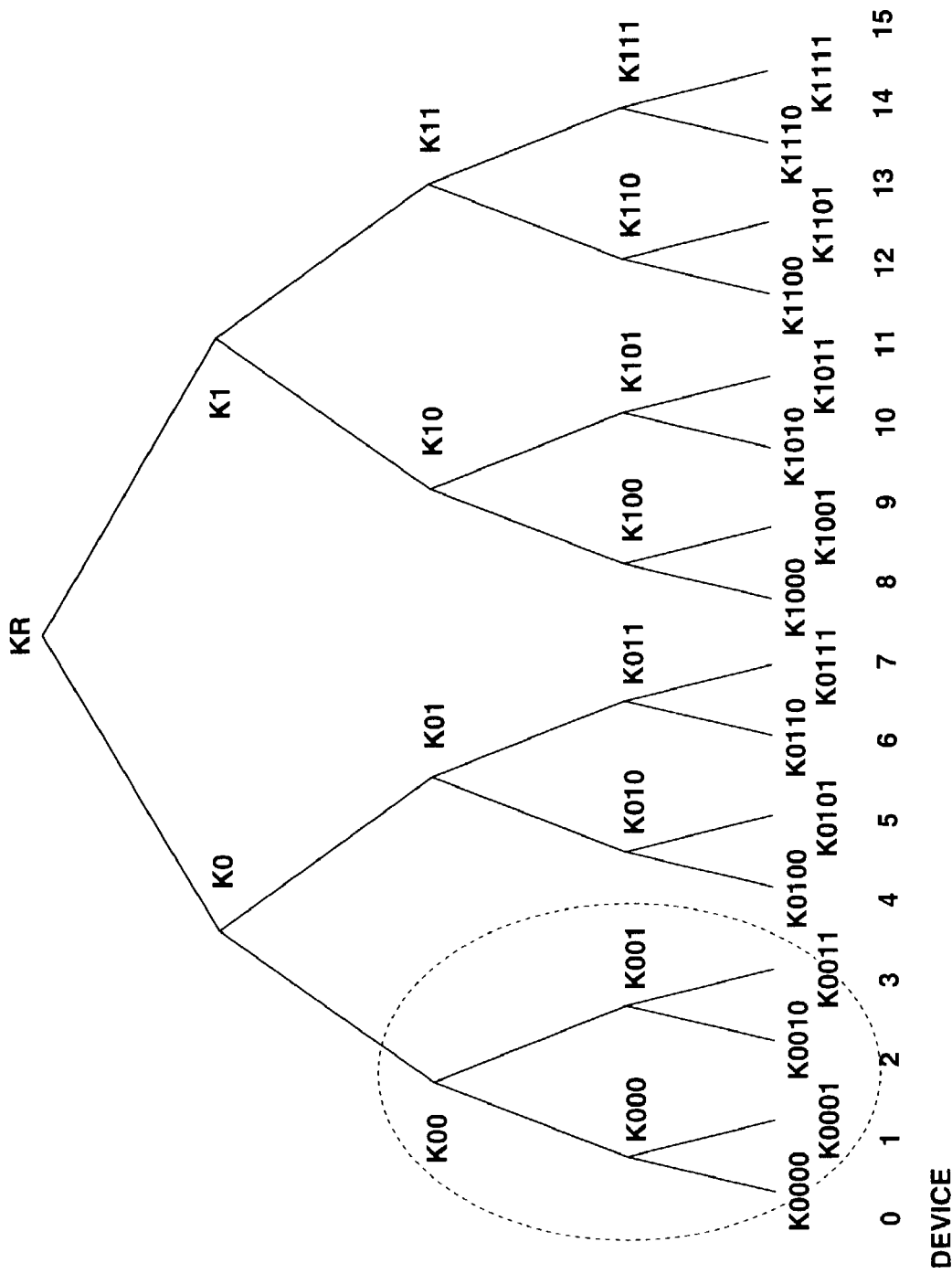
FIG. 3 is a tree constitution view for explaining encryption processing of various keys and data in the information processing system according to the present invention.

Numbers 0 to 15 shown in the lowest stage in FIG. 3 are individual devices on the content receiving side 20. That is, each leaf of the hierarchical tree structure shown in FIG. 3 corresponds to a device.

Each of devices 0 to 15 stores a key set comprising a key assigned to a node from own leaf to a root (a node key) and a leaf key of each leaf, in the hierarchical tree shown in FIG. 3, at the time of manufacture or at the time of shipment, or afterwards. K0000 to K1111 shown in the lowest stage of FIG. 3 are respectively leaf keys assigned to devices 0 to 15, and keys from KR to K111 described in the second node from the lowest stage are node keys.

In the constitution shown in FIG. 3, for example, a device 0 has a leaf key K0000 and node keys K000, K00, K0, KR. A device 5 has K0101, K010, K01, K0, KR. A device 15 has K1111, K111, K11, K1, KR. In the tree of FIG. 3, only 16 devices 0 to 15 are described, and the tree structure is shown as a systematic constitution to left and right well balanced of a 4-stage constitution. However, much more devices may be constituted in the tree, and the parts of the tree may have the different number of stages.

Further, each device included in the tree structure shown in FIG. 3 includes various recording media, for example, DVD, CD, MD of the embedded type or the type detachably mounted on the device, or devices of various types using a flash memory or the like. Further, various application service may coexist. In addition to the coexisting constitution of various devices and various application, the hierarchical tree structure which is a content or a key distributing constitution shown in FIG. 3 is applied.

In the system in which various devices and applications coexist, for example, a portion surrounded by the dotted line in FIG. 3, that is, the devices 0, 1, 2 and 3 are set as a single group using the same recording medium. For example, with respect to the device included in the group surrounded by the dotted line, processing is executed such that a common content is encrypted and sent from a provider, a content key used in common to devices is sent, or payment data for content charges is also encrypted and output from each device to a provider or a settlement organization. The organization for carrying out data transmit-receiving to and from the devices such as a content provider or a settlement organization executes processing for sending the portion surrounded by the dotted line of FIG. 3, that is, data collectively with the device 0, 1, 2, 3 as one group. A plurality of such groups are present in the tree of FIG. 3. The organization for carrying out data transmit-receiving to and from devices such as a content provider or a settlement organization functions as message data distributing means.

Node keys and leaf keys may be controlled collectively by a single key control center, or may be controlled every group by message data distributing means such as a provider, or a settlement organization for carrying out transmit-receiving of various data with respect to groups. These node keys and leaf keys are subjected to renewal processing when a key is leaked. This renewal processing is executed by a key control center, a provider or a settlement organization.

In this tree structure, as will be apparent from FIG. 3, three devices 0, 1,2, 3 included in one group hold common keys K00, K0, KR as a node key. By utilizing this node key common constitution, for example, a common content key can be distributed to only devices 0, 1, 2, 3. For example, if the node key K00 itself held in common is set as a content key, only the devices 0, 1, 2, 3 can be set as a common content key without executing new sending of key. Further, a value Enc(K00, Kcon) obtained by encrypting a new content key Kcon by a node key. K00 is distributed to the devices 0, 1, 2, 3 through a network or by being stored in the recording medium, only the devices 0, 1, 2, 3 can decryption the encrypted Enc(K00, Kcon) using a common node key K00 held in the respective devices to obtain a content key: Kcon. The Enc(Ka, Kb) indicates data into which Kb is encrypted by Ka.

Further, where at the time t, keys: K0011, K001, K00, K0, KR owned by the device 3 are analyzed by a hacker and then exposed, it is necessary for protecting data transmit-received in a system (a group of devices 0, 1, 2, 3) to separate the device 3 from the system. To this end, node keys: K001, K00, K0, KR are respectively renewed to new keys K(t)001, K(t)00, K(t)0, K(t)R, which renewed keys to be notified to the devices 0, 1, 2. Here, K(t)aaa indicates a renewal key of Kaaa of generation:t.

The distributing processing of renewal key will be described. Renewal of key is executed by storing a table constituted by block data called an enabling key block (EKB: Enabling Key Block) shown in FIG. 4A in a network, for example, or in a recording medium to supply them to the devices 0, 1, 2. The enabling key block (EKB) is constituted by a decryption key for distributing a key newly renewed to a device corresponding to each leaf constituting a tree structure as shown in FIG. 3. The enabling key block (EKB) is sometimes called a key renewal block (KRB: Key Renewal Block).

In the enabling key block (EKB) shown in FIG. 4A, only the device in which a node key need to be renewed is constituted as block data having a data constitution that can be renewed. An example of FIGS. 4A and 4B shows, in the devices 0, 1 and 2 in the tree structure shown in FIG. 3, block data formed for the. purpose of distributing a renewal node key of generation t. As will be apparent from FIG. 3, the device 0 and the device 1 require K(t)00, K(t)0, K(t)R as renewal node keys, and the device 2 requires K(t)001, K(t)00, K(t)0, K(t)R as renewal node keys.

As shown in EKB of FIG. 4A, a plurality of encrypted keys are included in EKB. The encrypted key in the lowest stage is Enc(K0010, K(t)001). This is a renewal node key K(t)001 encrypted by a leaf key K0010 of the device 2, and the device 2 is able to decrypt this encrypted key by its leaf key to obtain K(t)001. By using K(t)001 obtained by decrypting, an encrypted key Enc(K(t)001, K(t)00) in the second stage from bottom can be decrypted to obtain a renewal node key K(t)00. Sequentially, an encrypted key Enc(K(t)00, K(t)0) in the second stage from top of FIG. 4A is decrypted to obtain a renewal node key K(t)0, and an encrypted key Enc(K(t)0, K(t)R) in the first stage from top of FIG. 4A is decrypted to obtain K(t)R. On the other hand, in the device K 0000, K0001, a node key K000 is not included to be renewed, and a key necessary for a renewal node key is K(t)00, K(t)0, K(t)R. The device K0000.K0001 decrypts an encrypted key Enc(K000, K(t)00) in the third stage from top of FIG. 4A to obtain K(t)00, and thereafter, an encrypted key Enc(K(t)00, K(t)0) in the second stage from top of FIG. 4A is decrypted, and an encrypted key Enc(K(t)0, K(t)R) in the first stage from top of FIG. 4A is decrypted to obtain K(t)R. By doing so, the devices 0, 1, 2 can obtain a renewed key K(t)R. The index in FIG. 4A shows the absolute address of a node key and a leaf key used as a decryption key.

Where renewal of a node key: K(t)0, K(t)R in the upper stage in the tree structure shown in FIG. 3 is unnecessary, and a renewal processing of only the node key K00 is necessary, an enabling key block (EKB) in FIG. 4B can be used to distribute a renewal nod key K(t)00 to the devices 0, 1, 2.

EKB shown in FIG. 4B can be used, for example, to distribute a new content key in common in a specific group. Concretely, it is supposed that the devices 0, 1, 2, 3 shown by the dotted line in FIG. 3 use a recording medium, and a new common content key(t)con is necessary. At this time, Enc (K(t)00, K(t)con) into which new common content key: K(t) con is encrypted with K(t)00 into which a common node key K00 of the devices 0, 1, 2 is renewed is distributed with EKB shown in FIG. 4B. By this distribution, distribution of data not decrypted in the apparatus of other groups such as a device 4 becomes enabled.

That is, if the devices 0, 1, 2 decrypt the encrypted sentence using K(t)00 obtained by processing EKB, a content key at the time t K(t)con can be obtained.

[Distribution of a Content Key Using EKB]

Figure 5:
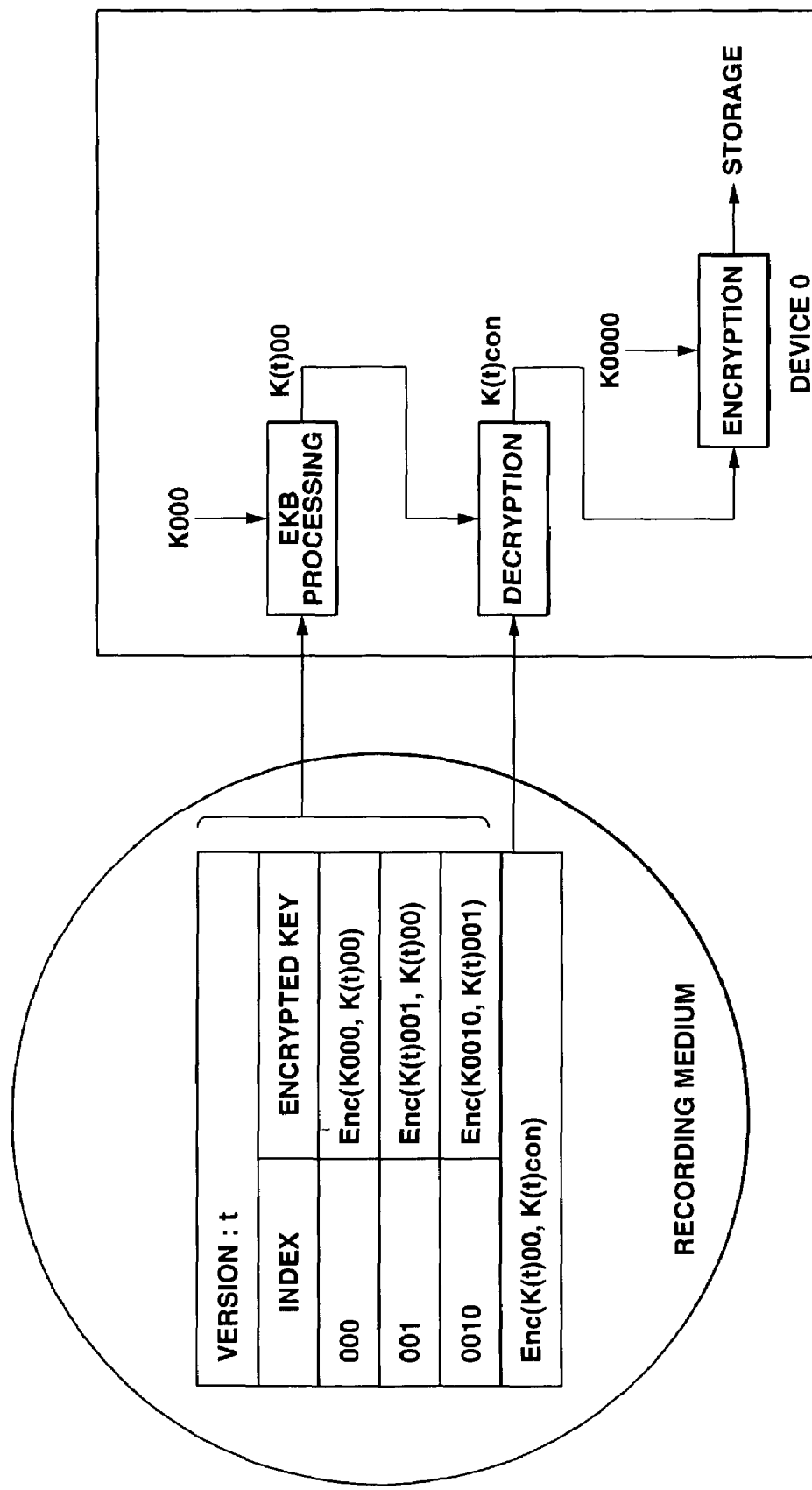
FIG. 5 is a view showing an example of distribution and an example of decrypting processing using an enabling key block (EKB) of content keys in the information processing system according to the present invention.

FIG. 5 shows, as an example of processing for obtaining a content key at the time t K(t)con, a processing of a device 0 which receives, through a recording medium, data Enc(K(t) 00, K(t)con into which a new common content key K(t)con is encrypted using K(t)00 and EKB shown in FIG. 4B. That is, this is an example in which encrypted message data by EKB is a content key K(t)con.

As shown in FIG. 5, a device 0 uses generation: EKB at generation: t stored in the recording medium and a node key K000 stored in advance by itself to produce a node key K(t)00 by the EKB processing similar to that described above. Further, a renewal content key K(t)con is decrypted using a renewal node key K(t)00 decrypted, and is encrypted by a leaf key K0000 owned by itself and stored in order to use it later.

[Format of EKB]

Figure 6:
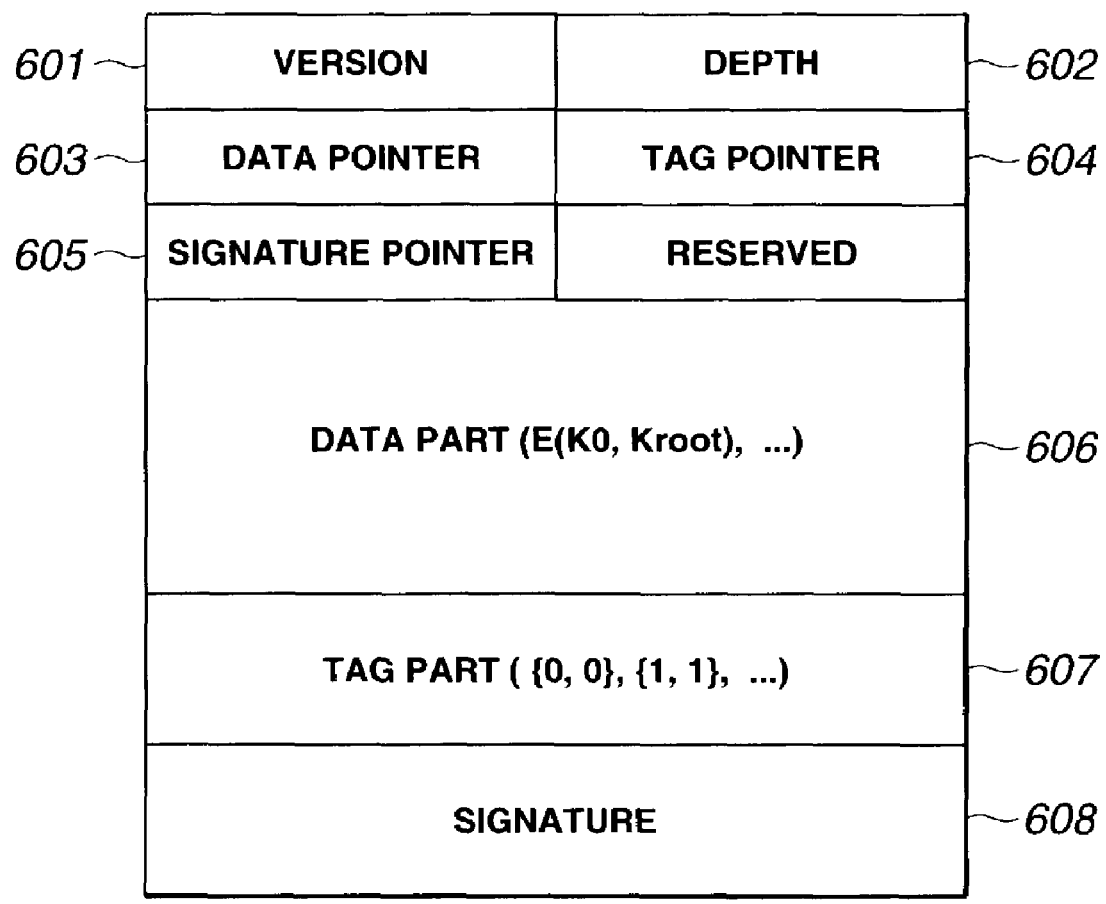
FIG. 6 is a view showing an example of a format of an enabling key block (EKB) in the information processing system according to the present invention.

FIG. 6 shows an example of format of the enabling key block (EKB). A version 601 is a discriminator showing the version of the enabling key block (EKB). The version has a function for showing a corresponding relation between a function for discriminating latest EKB and a content. The depth shows the number of hierarchies of a hierarchical tree with respect to a device of the distributing destination of the enabling key block (EKB). A data pointer 603 is a pointer for indicating a position of data part in the enabling key block (EKB), and a tag pointer 604 is a pointer for indicating a position of a tag part, and a signature pointer 605 is a pointer for indicating a position of signature.

A data part 606 stores, for example, data having a node key to be renewed encrypted. For example, it stores various encrypted keys in connection with a renewal node key as shown, in FIG. 5.

A tag part 607 is a tag for indicating a positional relationship of encrypted node keys and leaf keys stored in the data part. An attaching rule of this tag will be described with reference to FIGS. 7A to 7C. FIGS. 7A to 7C show an example for sending the enabling key block (EKB) described previously in FIG. 4A as data. The data at that time is as shown in FIG. 7B. An address of a top node included in an encrypted key at that time is used as a top node address. In this case, since a renewal key of a root key K(t)R is included, a top node address is KR. At this time, for example, data Enc(K(t)0, K(t)R) in the uppermost stage is at a position shown in a hierarchical tree shown in FIG. 7A. Next data is Enc(K(t)00, K(t)0), which is at a position under on the left hand of the previous data in the tree. Where data is exist, a tag is set to 0, and where data is not exist, a tag is set to 1. The tag is set as (left (L) tag, right (R) tag). Since data is exist at left of data at the top stage Enc(K(t)0, K(t)R), L tag=0, and since data is not exist to right, R tag=1. Tags are set to all the data to constitute a row of data and a row of tags shown in FIG. 7C.

The tag is set in order to show at which position of the tree structure data Enc(Kxxx, Kyyy) is positioned. Since the key data Enc(Kxxx, Kyyy) . . . are mere enumerated data of simply encrypted keys, a position on the tree of an encrypted key stored as data can be discriminated by the aforementioned tag. For example, data constitution as in the following can be provided using the node index placed in correspondence to the encrypted data like the constitution described in FIGS; 4A and 4B previously without using the aforementioned tag:

0: Enc(K(t)0, K(t)root)

00: Enc(K(t)00, K(t)0)

000: Enc(K(t)000, K(t)00)

However, the constitution using such an index as described results in lengthy data to increase data quantities, which is not preferable in the distribution through a network. On the other hand, the aforementioned tag is used as index data showing a key position whereby a key position can be discriminated with less data quantity.

Returning to FIG. 6, the EKB format will be further described. The signature is an electronic signature executed, for example, by a key control center, a content provider, a settlement organization or the like which issued the enabling key block (EKB). The device which received EKB confirms by authentication of signature that it is an enabling key block (EKB) issued by a valid enabling key block (EKB) issuer,

[Content Key Using EKB and Distribution of Contents]

While in the aforementioned example, a description was made of an example in which only the content key is sent along with EKB, a description will be made hereinafter of the constitution in which a content encrypted by a content key, and a content key encrypted by a content encrypted key along with a content key encryption key encrypted by EKB are sent.

Figures 8A, 8B:
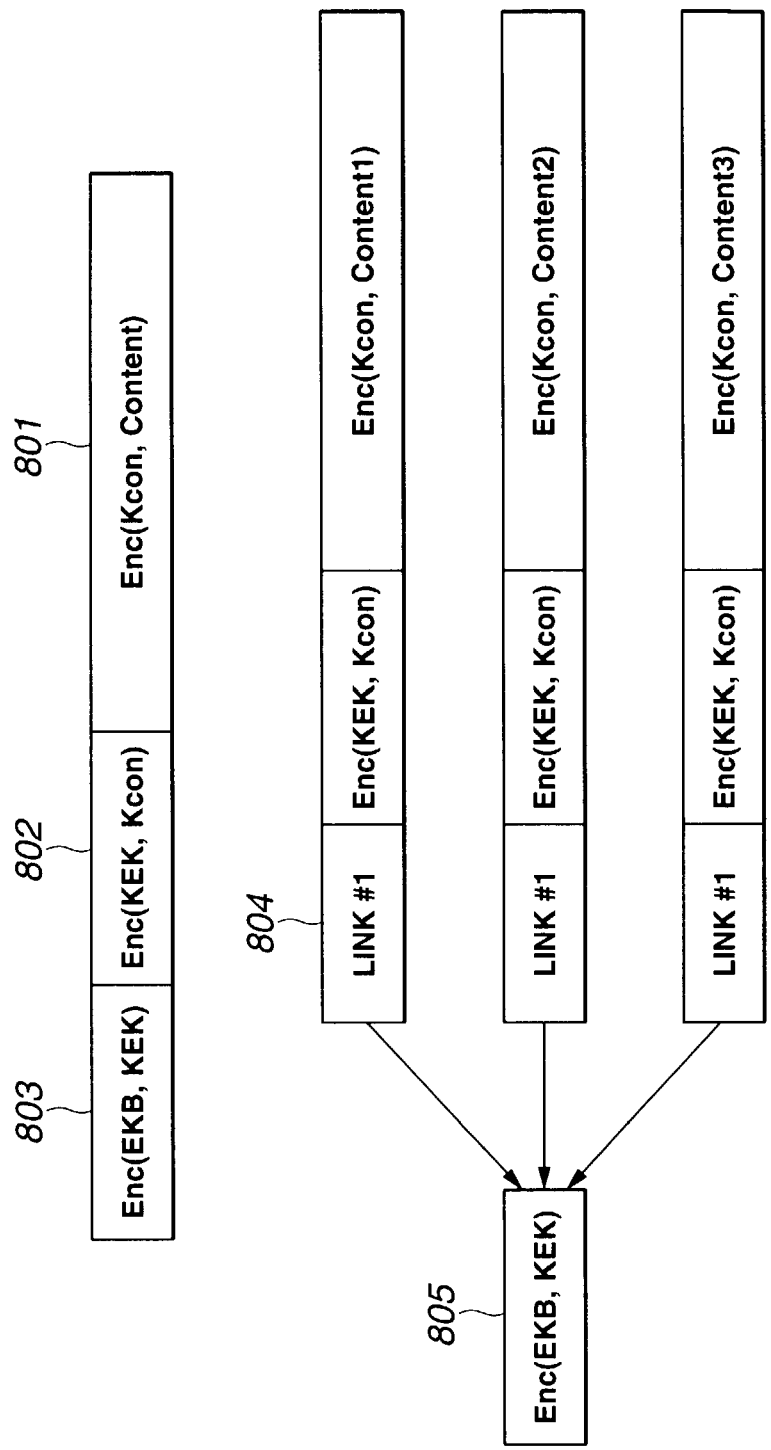
FIGS. 8A and 8B are views each showing an enabling key block (EKB) and an example of data constitution for distributing content keys and contents in the information processing system according to the present invention.

FIGS. 8A and 8B show this data constitution. In the constitution shown in FIG. 8A, Enc(Kcon, content) 801 is data in which a content is encrypted by a content key(Kcon), Enc (KEK, Kcon) 802 is data in which a content key (Kcon) is encrypted by a content key-encryption key (KEK: Key Encryption key), and Enc(EKB, KEK) 803 is data in which a content key-encryption key KEK is encrypted by an enabling key block (EKB).

Here, the content key-encryption key KEK may be a node key (K000, K00 . . . ) or a root key (KR) itself, and may be a key encrypted by a node key (K000, K00 . . . ). or a root key (KR).

FIG. 8B shows an example of constitution where a plurality of contents are recorded in media, which makes use of the same Enc(EKB, KEX) 805. In such a constitution as described, the same Enc(EKB, KEK) is not added to each data, but data showing a linking destination linked to Enc (EKB, KEK) is added to each data.

Figure 9:
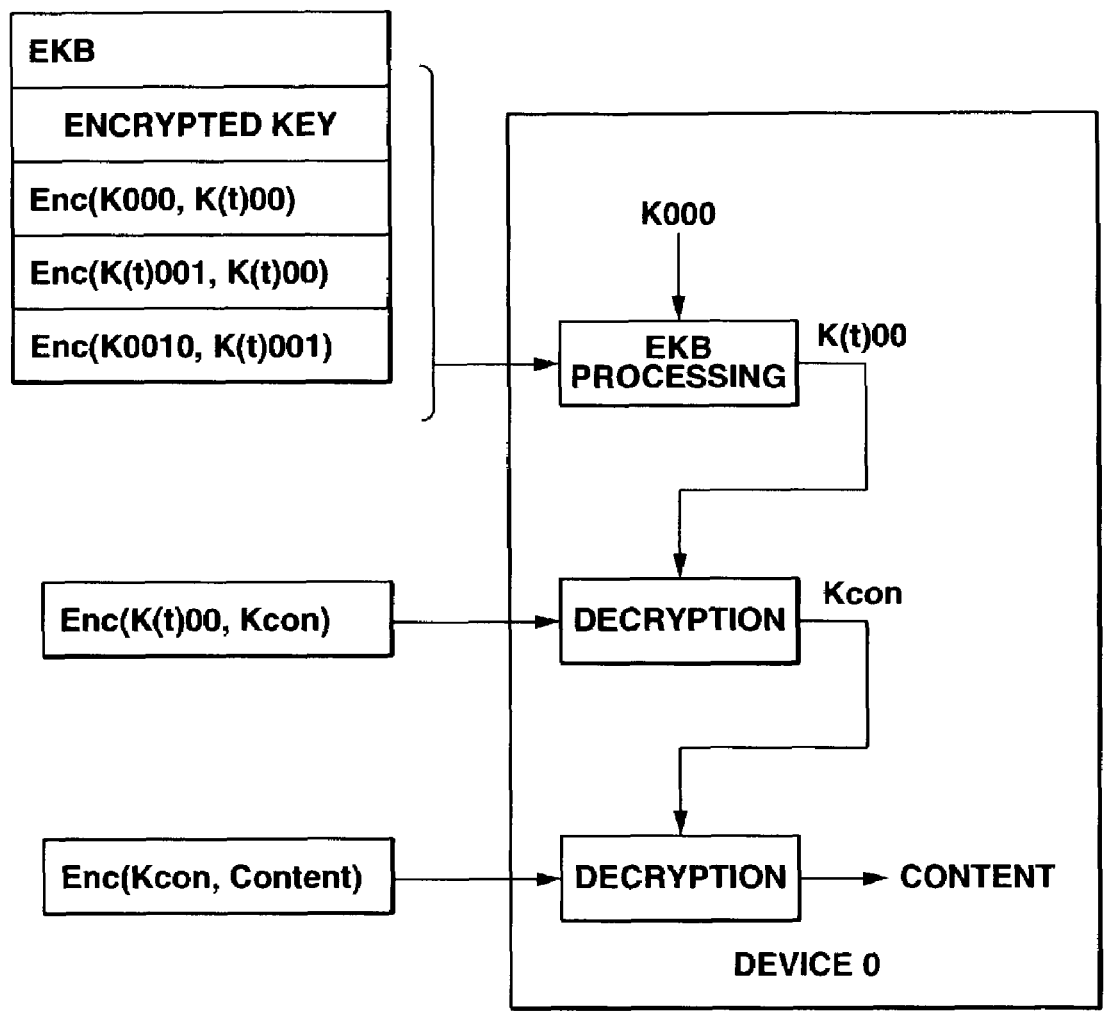
FIG. 9 is a view showing an example of processing in a device in case of distributing an enabling key block (EKB), content keys, and contents in the information processing system according to the present invention.

FIG. 9 shows an example of a case where a content encryption key KEK is constituted as a renewal node key K(t)00 obtained by renewed the node key K00 shown in FIG. 3. In this case, if in a group surrounded by the dotted frame in FIG. 3, the device 3 is revoked, for example, due to the leak of a key, data having an enabling key bock (EKB) shown in FIG. 9 and data into which a content key (Kcon) is encrypted by a content key encryption key (KEK=K(t)00), and data into which a content is encrypted by a content key (Kcon) are distributed to members of the other groups, that is, devices 0, 1, 2 whereby the devices 0, 1, 2 can obtain the content.

The right side in FIG. 9 shows the decrypting procedure in the device 0. The device 0, first, obtains a content key encryption key (KEK=K(t)00) by decrypting process using a leaf key K000 held by itself from the received enabling key bock. Then, the device 0 obtains a content key Kcon decrypted by the K(t)00, and further. carries out decrypting by the content key Kcon. The device 0 can use the content as a result of the above process. The devices 1, 2 are also able to obtain a content key encryption key (KEK=K(t)00) by processing EKB by the different procedures and are able to use the content similarly.

The devices 4, 5, 6 . . . of the other groups shown in FIG. 3 are not able to obtain a content key encryption key (KEK=K(t)00) using a leaf key and a node key held by themselves even if they receive the same data (EKB) as mentioned above. The device 3 revoked is likewise not able to obtain the content key encryption key (KEK=K(t)00) by a leaf key and a node key, and only the device having the proper right is able to decrypt and use the content.

If the distribution of a content key making use of EKB is used, in a manner as described, the encrypted content which only valid right holder can decrypt can be distributed safely.

An enabling key block (EKB), a content key, an encrypted content or the like has a constitution capable of providing distribution safely through a network, but the enabling key block (EKB), the content key and the encrypted content can be also stored in a recording medium such as DVD, CD and provided to a user. In this case, if constitution is made such that a content key obtained by decrypting an enabling key block (EKB) stored in one and the same recording medium is used for decrypting the encrypted content stored in the recording medium, distribution process of an encrypted content that can be used only with a leaf key and a node key held in advance by the valid right holder only, that is, content distribution for which a usable user's device is limited can be realized by a simple constitution.

Figure 10:
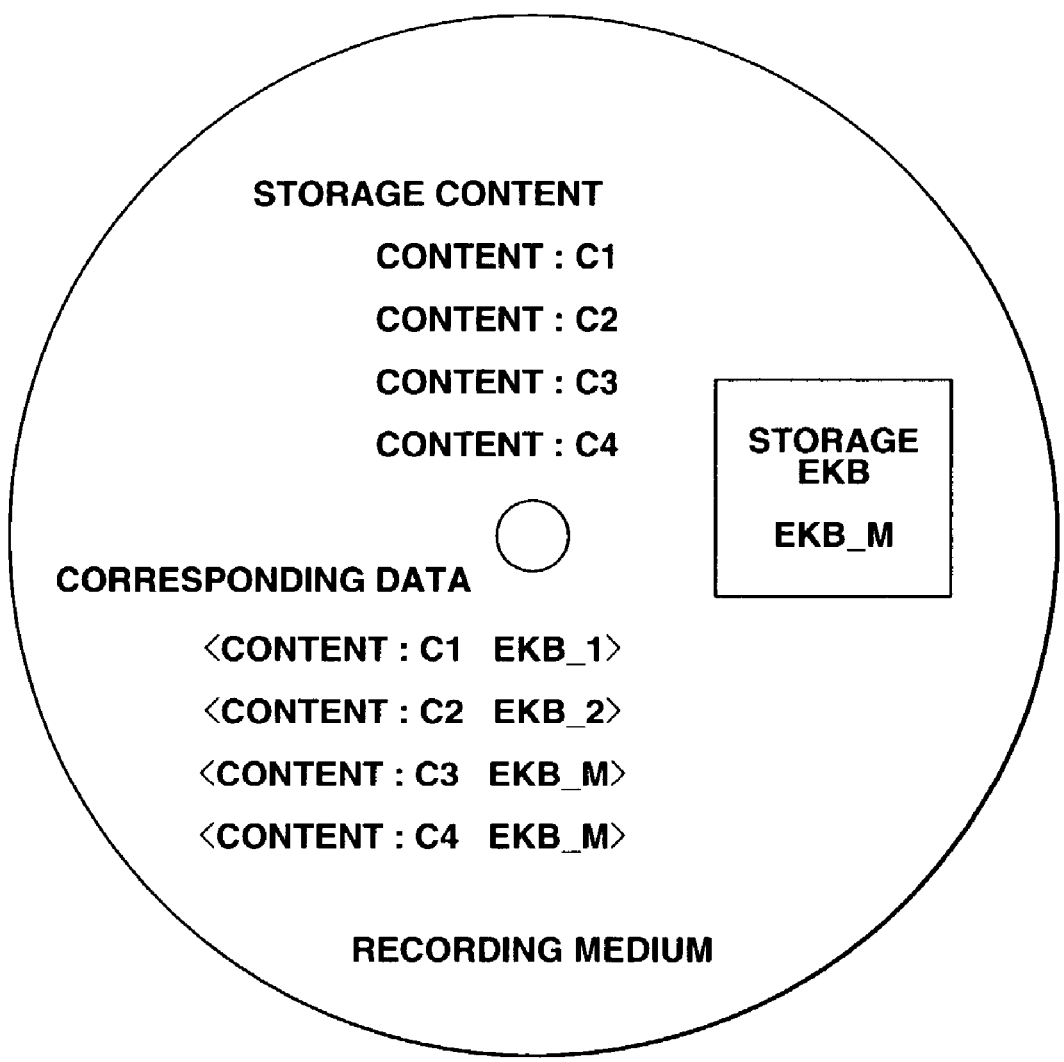
FIG. 10 is a view for explaining the situation how to cope with the case where an enabling key block (EKB) and contents are stored in the information processing system according to the present invention.

FIG. 10 shows an example of constitution in which an enabling key block (EKB) is stored together with an encrypted content are stored in a recording medium. In the example shown in FIG. 10, stored in the recording medium are contents C1 to C4, data with the enabling key block corresponding to each stored content placed in correspondence thereto, and an enabling key block of version M (EKB-M). For example, EKB-1 is used to produce a content key Kcon1 having a content C1 encrypted, and for example, EKB-2 is used to produce a content key Kcon2 having a content C2 encrypted. In this example, an enabling key bock of version M (EKB-M) is stored in a recording medium. Since contents C3, C4 is placed in correspondence to the enabling key block (EKB-M), contents of the contents C3, C4 can be obtained by decrypting the enabling key block (EKB-M). Since EKB-1, EKB-2 are not stored in a disk, it is necessary to obtain EKB-1, EKB-2 necessary for decrypts the respective content keys by new distribution means, for example, network distribution or distribution by a recording medium.

Figure 11A:
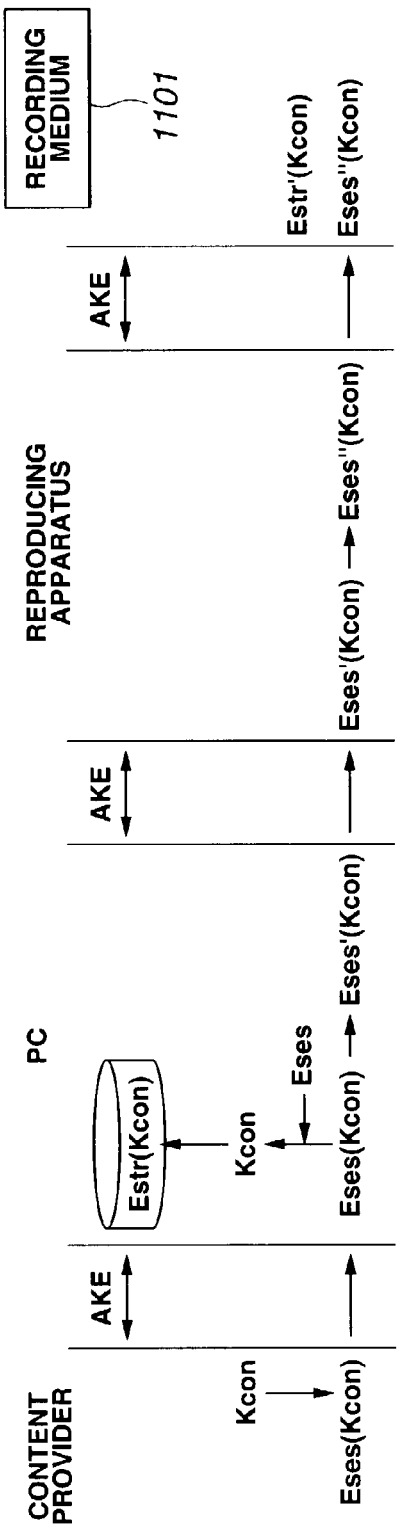
FIGS. 11A and 11B are views each showing comparison between processing for sending an enabling key block (EKB) and contents in the information processing system according to the present invention and a conventional sending processing.
Figure 11B:
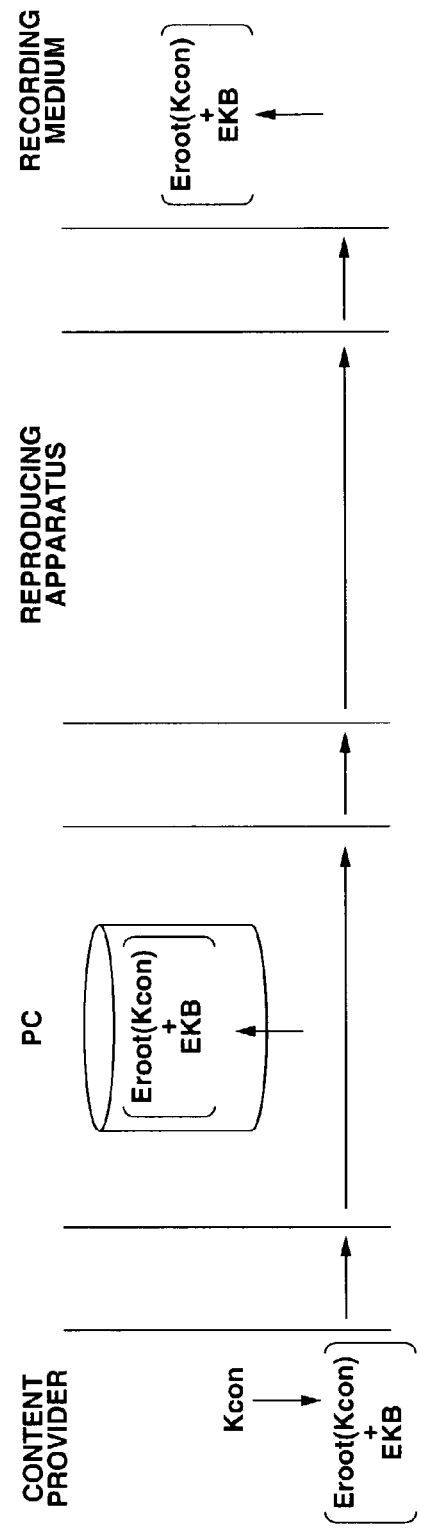

FIGS. 11A and 11B show a comparative example between a content key distribution by using EKB and conventional content key distribution where a -content key is circulated among a plurality of devices. FIG. 11A shows the conventional constitution, and FIG. 11B shows an example making use of an enabling key block (EKB).according to the present invention. In FIGS. 11A and 11B, Ka (Kb) indicates data in which Kb is encrypted by Ka.

As shown in FIG. 11A, processing has been heretofore carried out in which validity of a data transmit-receiver is confirmed, authentication processing and authentication and key exchange (AKE) are executed between devices to co-own a session key Kses used in encrypting process of data transmission, and a content key Kcon is encrypted by the session key Kses under the condition that the authentication is established to effect transmission.

For example, in PC shown in FIG. 11A, it is possible to decrypt a content key Kses encrypted by a session key received by the session key to obtain Kcon, and further possible to encrypt Kcon obtained by a stored key Kstr held by PC itself to store it in own memory.

In FIG. 11A, processing is necessary in which even where data is desired to be distributed in the form capable of being used for only a recording device 1101 shown in FIG. 11A, when PC or a reproducing device is present, authentication process as shown in FIG. 11A is executed so that content keys are encrypted by the respective session keys to effect distribution. The PC or the reproducing device is likewise able to use a session key produced in the authentication process and co-owned to decrypt an encrypted content key and obtain a content key.

On the other hand, in an example making use of an enabling key block (EKB) shown in the lower stage of FIG. 11B, an enabling key block (EKB), and data (Kroot (Kcon)) having a content key Kcon encrypted by a node key or a root key obtained by processing the enabling key block (EKB) are distributed from a content provider, whereby the content key Kcon can be decrypted and obtained by only the apparatus capable of processing EKB distributed.

Accordingly, for example, the useable enabling key block (EKB) is produced only on the right end in FIG. 11B, and the enabling key block (EKB), and data having a content key Kcon encrypted by a node key or a root key obtained by EKB processing are sent together whereby the PC, the reproducing apparatus or the like present cannot execute processing of EKB by a leaf key or node key owned by itself. Accordingly, the useable content key can be distributed to only the valid device safely without executing processes such as authentication process between the data transmit-receive devices, the production of a session key, and the process for encrypting a content key Kcon by the session key.

Where the useable content key is desired to be distributed to PC, a recording and reproducing unit also, an enabling key block (EKB) capable of being processed is produced and distributed to thereby obtain a common content key.

[Distribution of Authentication Key Using Enabling Key Block (EKB) (Common Key System)]

In the distribution of data used in the enabling key block (EKB) or a key described above, since an enabling key block (EKB) and a content or a content key which are transferred between devices always maintain the same encryption form, there is the possibility that an invalid copy is produced due to the so-called replay attack, which steals and records a data transmission channel and transfer it later again. For preventing such an attack as described, there is effective means for executing authentication process and key exchange process similar to those of prior art between data transfer devices. Now, a description is made of the constitution in which an authentication key Kake used when the authentication process and key exchange process are executed is distributed to a device using the aforementioned enabling key block (EKB) whereby the authentication process in conformity with a common key system having a common authentication key as a safe private key is executed. That is, this is an example in which encrypted message data by EKB is used as an authentication key.

Figure 12:
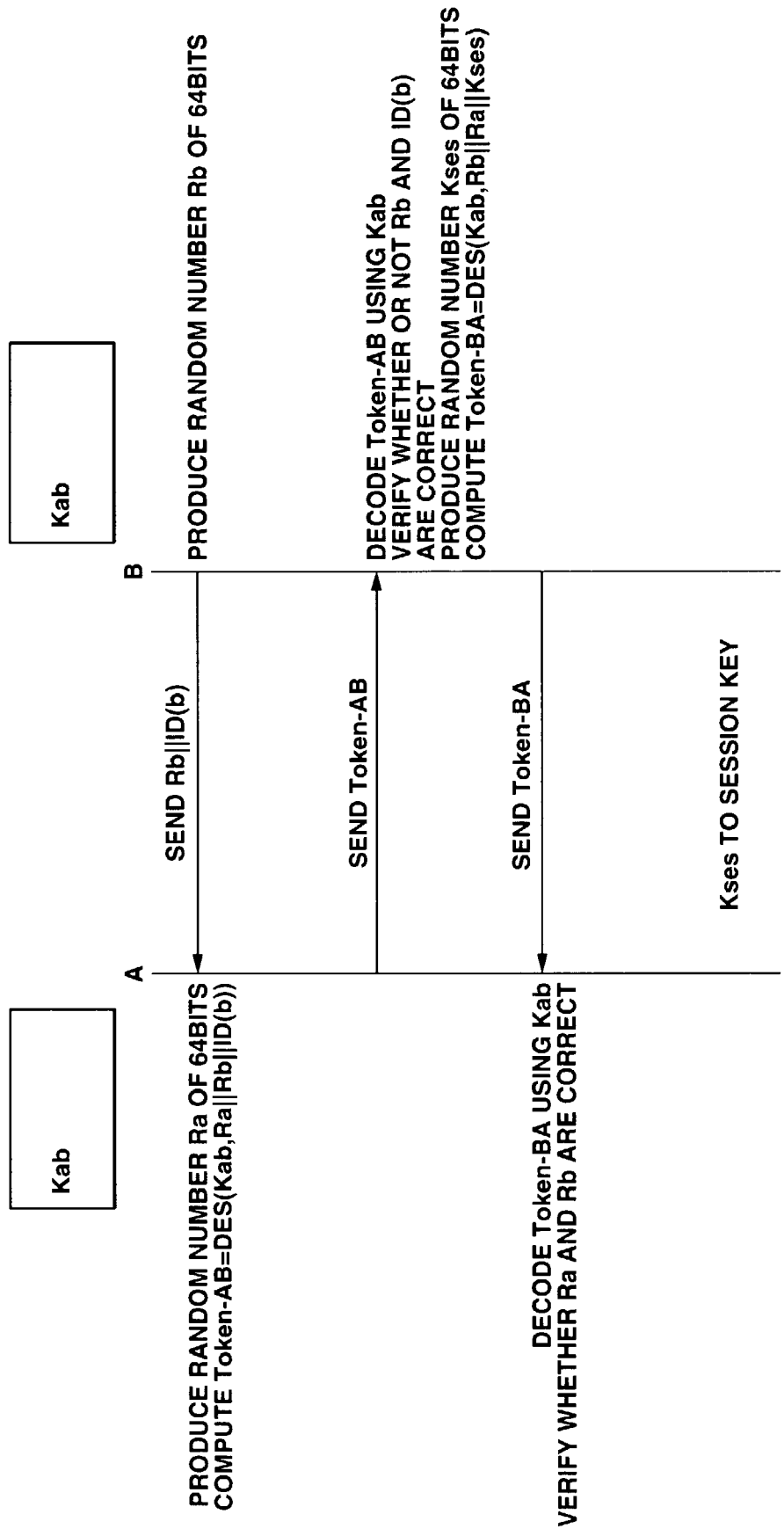
FIG. 12 is a view showing an authentication processing sequence according to an applicable common key encryption system in the information processing system according to the present invention.

FIG. 12 shows a mutual authentication method (ISO/IEC 9798-2) using a common key encryption system. While in FIG. 12, DES is used as the common key encryption system, other systems may be used as long as they are the common key encryption system. In FIG. 12, first, B produces the random number Rb of 64 bits, and Rb and ID (b), which is own ID, are transmitted to A. A which receives them newly produces the random number Ra of 64 bits, and data are encrypted using a key Kab in the CBC mode of DES in order to Ra, Rb and Rc to transmit them to B. The key Kab is a key to be stored in a recording element as a private key common to A and B. According to the encrypting processing by the key Kab using the CBC mode of DES, for example, in the processing using DES, an initial value and Ra are subjected to exclusive OR; in the DES encryption part, the key Kab is used for encrypting to generate an encrypted text E1and continuously, the encrypted text E1 and Rb are subjected to exclusive OR; in the DES encryption part, a key Kab is used for encrypting, and encrypted text E2 and ID (b) are subjected to exclusive OR; and in the DES encryption part, a key Kab is used for encrypting to generate transmission data (Token-AB) by an encrypted text E3 produced.

B, which received the above data, decrypts the received data by a key Kab (authentication key) likewise stored in a recording element as a common private key. A decrypting method of received data, first, decrypts an encrypted text E1 by an authentication key Kab to obtain the random number Ra. Next, an encrypted text E2 is decrypted by an authentication key Kab, and the result therefrom and E1 are subjected to exclusive OR to obtain Rb. Finally, an encrypted text E3 is decrypted by an authentication key Kab, and the result therefrom and E2 are subjected to exclusive OR to obtain ID (b). Authentication is made if Ra and ID (b) out of Ra, Rb and ID (b) thus obtained are coincided with one transmitted by B. When passed this authentication, B authenticates that A is valid.

Next, B produces a session key (Kses) to be used after authentication (Producing method: To use the random number). Then, Rb, Ra, Kses are encrypted in that order using an authentication key Kab in the CBC mode of DES and are returned to A.

A, which received the above data, decrypts the received data by an authentication key Kab. A decrypting method of the received data is similar to the decrypting process of B, which is therefore omitted in its detail. Authentication is made if Rb and Ra out of Rb, Ra and Kses thus obtained are coincided with one transmitted by A. When passed the authentication, A authenticates that B is valid. After authentication of mating parties each other, the session key Kses is used as a common key for secrete communication after authentication.

Where invalidity or uncoincidence is found when the received data are authenticated, processing is interrupted as a failure of mutual authentication.

In the above-described authentication process, A and B co-own a common authentication key Kab. The common authentication key Kab is distributed to a device using the enabling block key (EKB).

For example, in the example shown in FIG. 12, there may be employed the constitution in which out of A or B, the other encrypts an authentication key Kab and an enabling key block (EKB) produced by producing a decodable enabling key block (EKB) to transmit it to the other, or the constitution in which a third party produces an enabling key bock (EKB) that can be used by both devices A and B for the devices A and B to encrypt an authentication key Kab by the enabling key block (EKB) produced for the devices A, B to distribute it.

Figure 13:
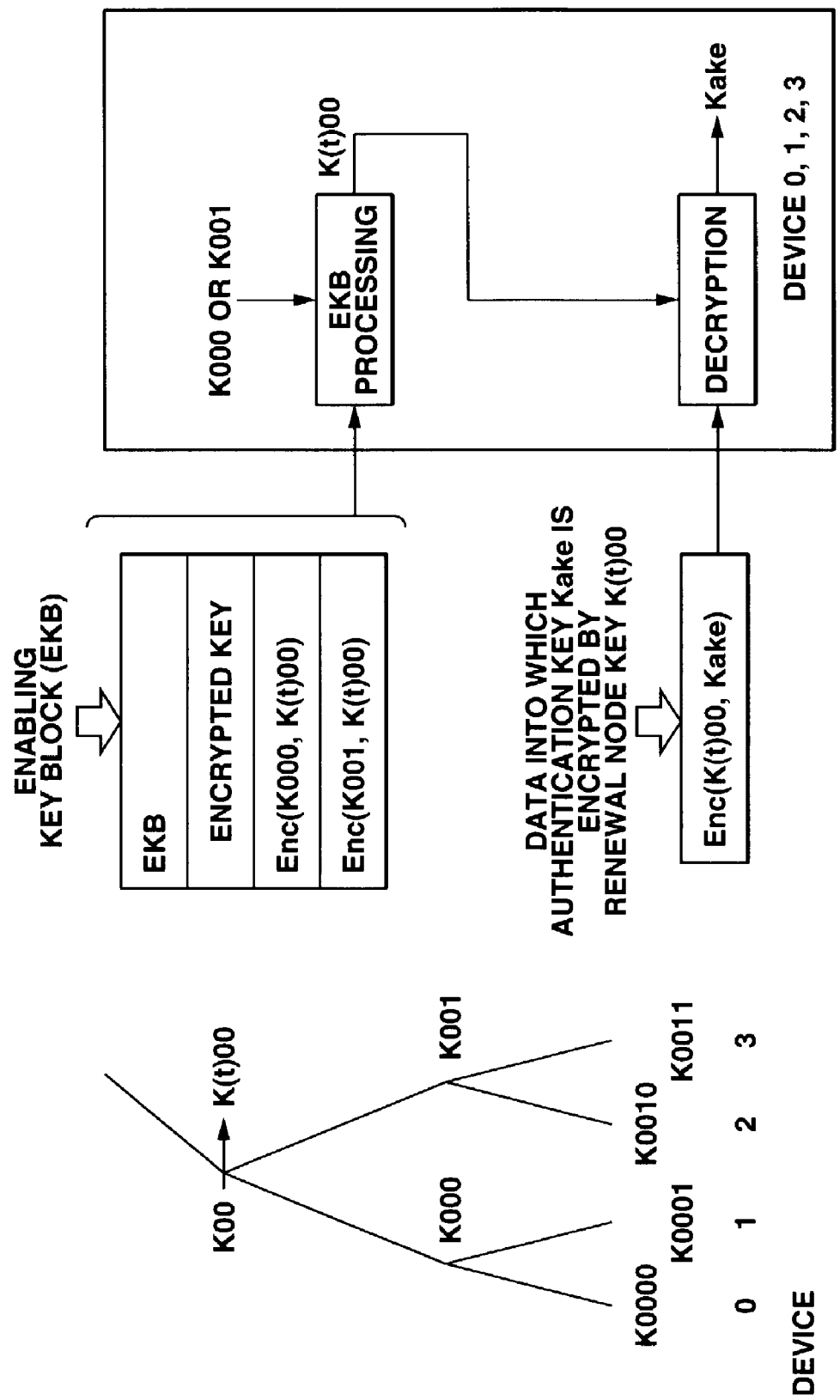
FIG. 13 is a view (1) showing an enabling key block (EKB), a data constitution for distributing an authentication key, and a processing example by a device in the information processing system according to the present invention.
Figure 14:
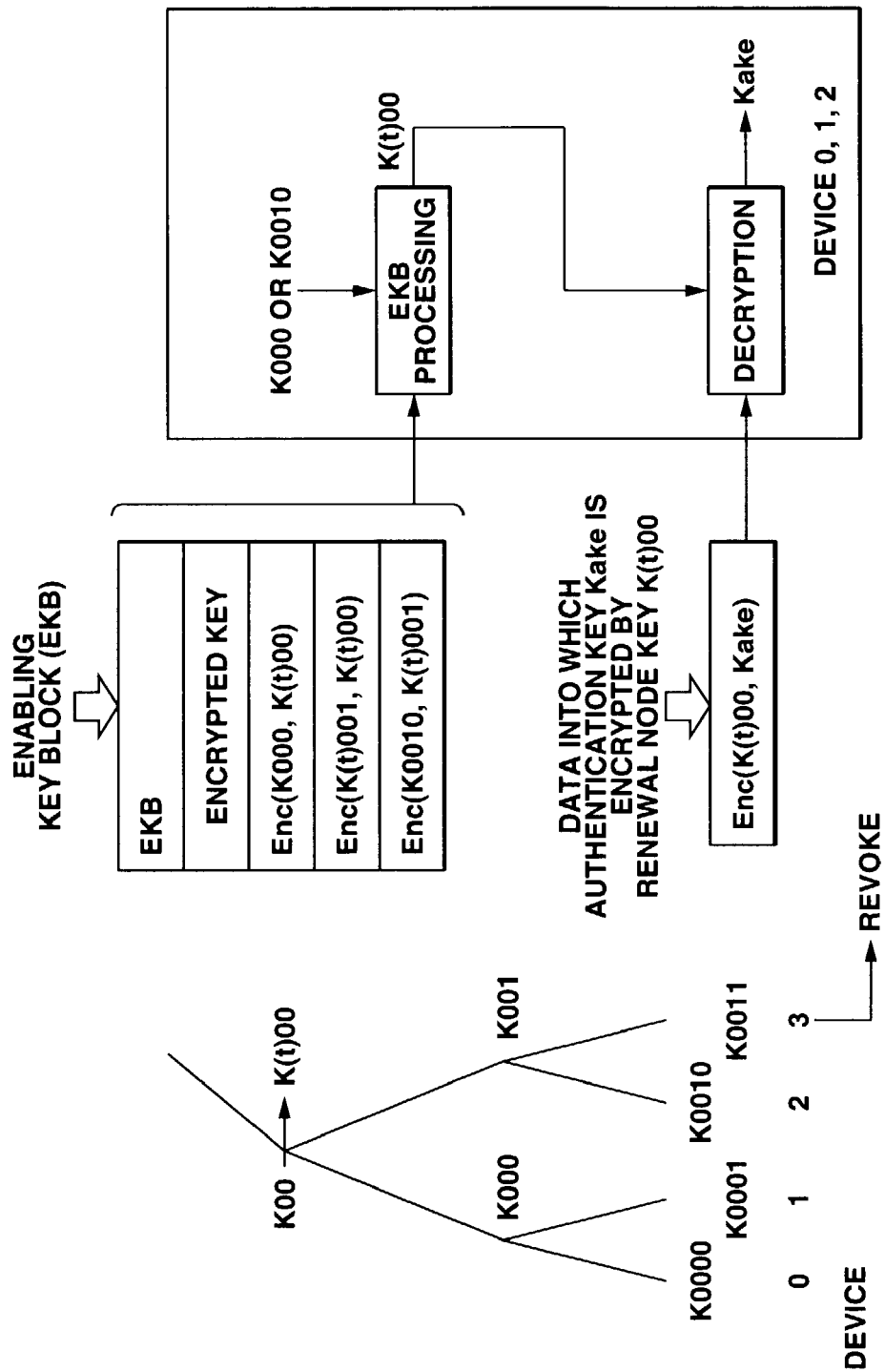
FIG. 14 is a view (2) showing an enabling key block (EKB), a data constitution for distributing an authentication key, and a processing example by a device in the information processing system according to the present invention.

FIGS. 13 and 14 show examples of the constitution in which an authentication key Kake common to a plurality of devices is distributed by an enabling key block (EKB). FIG. 13 shows an example in which a decodable authentication key Kake is distributed to devices 0, 1, 2, 3, and FIG. 14 shows an example in which the device 3 out of the devices 0, 1, 2, 3 is revoked to distribute a decodable authentication key to only the devices 0, 1, 2.

In the example of FIG. 13, a node key K(t)00 renewed using a node key and a leaf key in the devices 0, 1, 2, 3 is produced and distributed, by producing a decodable enabling key block (EKB), along with data (b) having an authentication key Kaka decrypted by a renewable node key K(t)00. First, the respective devices, as shown on the right side of FIG. 13, processes (decrypts) EKB to thereby obtain a renewed node key K(t)00, and then decrypts an authentication key: Enc(K(t)00, Kake) encrypted using the obtained node key K(t)00 to obtain an authentication key Kake.

In other devices 4, 5, 6, 7 . . . , even if the same enabling key block (EKB) is received, the node key K(t)00 renewed by processing EKB cannot be obtained, and therefore, an authentication key can be sent to only the valid device safely.

On the other hand, the example of FIG. 14 is an example in which as the device is, for example, revoked by leak of a key, the device 3 in a group surrounded by the dotted frame of FIG. 3 produces a decodable enabling key block (EKB) with respect to the only members of the other group, that is, the devices 0, 1, 2 for distribution. Data having (a) an enabling key block (EKB) and (b) an authentication key (Kake) shown in FIG. 14 encrypted by the node key (K(t)00) are distributed.

On the right side of FIG. 14, the decrypting procedure is shown. First, the devices 0, 1, 2 obtains an enabling node key (K(t)00) by decrypting process using a leaf key or a node key owned by itself from the received enabling key block. Next, the devices obtain an authentication Key Kake by decrypting made by K(t)00.

The devices 4, 5, 6 . . . in the other group shown in FIG. 3 cannot obtain a renewal node key (K(t)00) using a leaf key and a node key owned by itself even if similar data (EKB) is received. Similarly, also in the device 3 revoked, the renewal node key (K(t)00) cannot be obtained by a leaf key and a node key owned by itself, and only the device having a valid right is able to decrypt an authentication key for use.

If distribution of an authentication key making use of EKB is used, only the valid right holder is able to distribute a decodable authentication key safely with less data quantity.

[Distribution of Content Key Using a Public Key Authentication and an Enabling Key Block (EKB)]

Figure 15:
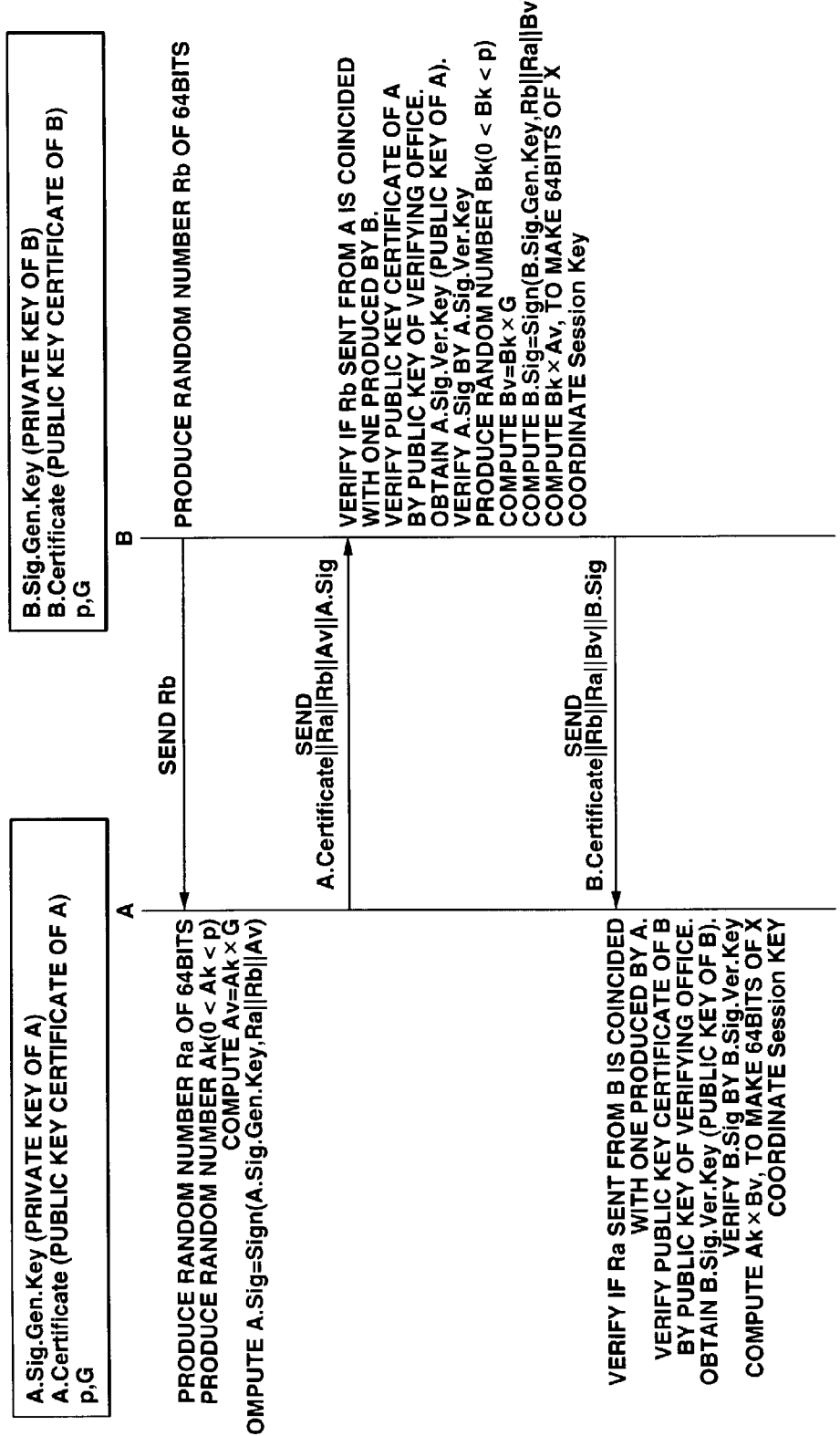
FIG. 15 is a view showing an authentication processing sequence by a public key encryption system applicable in the information processing system according to the present invention.

In the following, the distribution process of the content key using a public key authentication and an enabling key block (EKB) will be described. First, a mutual authentication method using an elliptic curve encryption of 160-bit length, which is a public key encryption system, will be described with reference to FIG. 15. In FIG. 15, ECC is used as the public key encryption system, but any system may be used as long as it is a public key encryption system similar thereto. Further, the key size need not be 160 bits. In FIG. 15, first, B produces the random number Rb of 64 bits to transmit it to A. A which received it newly produces the random number Ra of 64 bits and the random number Ak smaller than the prime number p. And, a point Av=Ak×G obtained by making a base point G, Ak times is obtained to produce an electronic signature A. Sig with respect to Ra, Rb, Av (X coordinate and Y coordinate), which is returned along with a public certificate of A to B. In Ra and Rb, X coordinate and Y coordinate of 64 bits, Av are respectively 160 bits, and therefore, an electronic signature with respect to 448 bits in total is produced.

B which received the public key certificate, Ra, Rb, Av, the electronic signature A. Sig authenticates if Rb transmitted by A is coincided with one produced by B. As a result, when coincided, an electronic signature within the public key certificate of A is authenticated by a public key of an authentication office to take out a public key of A. The electronic signature A. Sig is authenticated using a public key of A taken out.

Next, B produces the random number Bk which is smaller than the prime number p. A point Bv=Bk×G obtained by making a base point G Bk times is obtained to produce an electronic signature B. Sig with respect to Rb, Ra, Bv (X coordinate and Y coordinate), which is returned to A along with a public key certificate of B.

A which received the public key certificate, Rb, Ra, Av, the electronic signature B. Sig of B authenticates if Ra transmitted by B is coincided with one produced by A. As a result, when coincided, an electronic signature within the public key certificate of B is authenticated by a public key of an authentication office to take out a public key of B. The electronic signature B. Sig is authenticated using a public key of B taken out. After the authentication of an electronic signature has been succeeded, A authenticates B to be valid.

Where both of them have succeeded for authentication, B computes Bk×Av (Since Bk is the random number, but Av is the point on the elliptic curve, scalar-times computation at the point on the oval curve is necessary.), and A computes Ak×Bv, and uses the lower 64 bits of the X coordinate of these points as a session key for use for thereafter communication (where a common key encryption is a common key encryption of 64 bit key length). Of course, a session key may be produced from the Y coordinate, and the coordinate need not be the lower 64 bits. In the secrete communication after mutual authentication, sometimes, the transmission data is not only encrypted by a session key but is also applied with an electronic signature.

Where in the authentication of an electronic signature or authentication of the received data, invalidity or uncoincidence is found, processing is interrupted due to a failure of mutual authentication.

Figure 16:
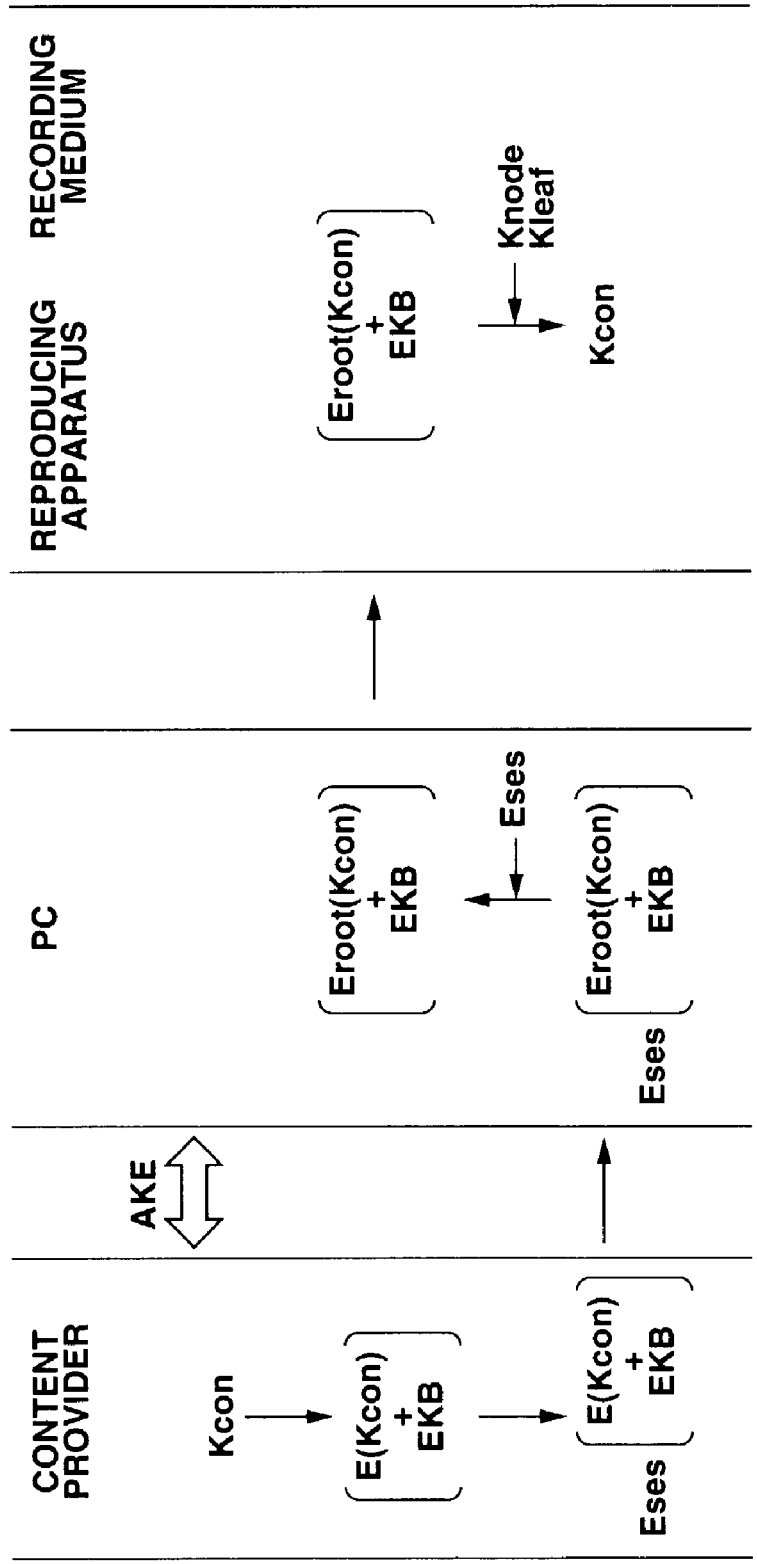
FIG. 16 is a view showing a processing for distributing an enabling key block (EKB) and content keys using the authentication principle by a public key encryption system in the present invention.

FIG. 16 shows an example of distribution process of content keys using a public key authentication and an enabling key block(EKB), First, the authentication process according to the public key system explained referring to FIG. 15 is executed between a content provider and PC. The content provider produces a decodable EKB by a reproducing apparatus which is a content key distribution, destination, a node key and a leaf key owned by a recording medium to encrypt a content key E(Kcon) which executed encryption by a renewal node key and an enabling key block (EKB) by a session key Kses produced by the authentication process between PCs, which is transmitted to PC.

PC decrypts [a content key E (Kcon) which executed encryption by a renewal node key and an enabling key block (EKB)] encrypted by a session key, and thereafter transmits it to a reproducing apparatus and a recording medium.

The reproducing apparatus and the recording medium decrypt [a content key E (Kcon) which executed encryption by a renewal node key and an enabling key block (EKB)] to thereby obtain a content key Kcon.

According to the above constitution, since [a content key E (Kcon) which executed an encryption by a renewal node key and an enabling key block (EKB)] are transmitted under the condition of the authentication between a content provider and PC, for example, even in the case where a node key is leaked, positive data transmission to a mating party is enabled.

[Distribution of a Program Code by Using an Enabling Key Block (EKB)]

While in the above-described example, a description has been made of a method for encrypting a content key, an authentication key or the like using an enabling key block (EKB) to distribute it, the constitution in which various program codes are distributed using an enabling key block (EKB) may be employed. That is, this is an example in which encrypted message data by EKB is used as a program code. This constitution will be described hereinafter.

Figure 17:
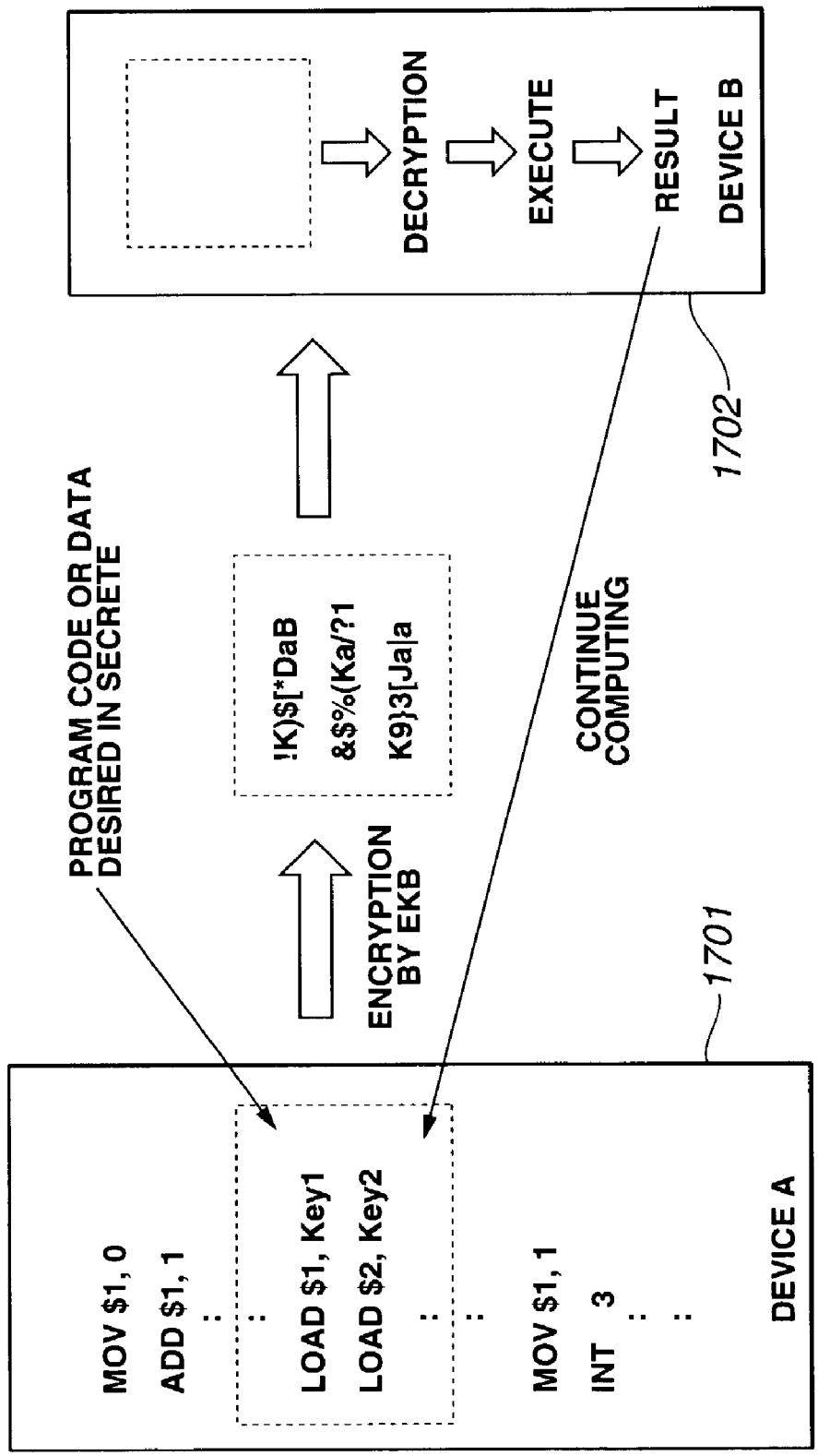
FIG. 17 is a view showing a processing for distributing an enabling key block (EKB) and encrypted program data in the information processing system according to the present invention.

FIG. 17 shows an example in which a program code is encrypted, for example, by a renewal node key of an enabling key block (EKB) to transmit it between devices. A device 1701 transmits an enabling key block (EKB) that can be decrypted by a node key and a leaf key of a device 1702 and a program code subjected to decrypting by a renewal node key contained in the enabling key block (EKB) to a device 1702. The device 1702 processes the received EKB to obtain a renewal node key, and further executes decrypting of a program code by a renewal node key obtained to obtain a program code.

In the example shown in FIG. 17, further, processing by the program code obtained in the device 1702 is executed to return the result to the device 1701, and the device 1701 further continues processing on the basis of the result.

As described above, the enabling key block (EKB) and the program code subjected to decrypting processing by the renewal node key contained in the enabling key block (EKB) are distributed whereby a program code capable of being decrypted in a specific device can be distributed to the specific device or the group shown in FIG. 3.

[Constitution for Causing ICV: Integrity Check Value to Correspond to a Transmission Content]

Next, a description will be made of the processing constitution in which for preventing falsification of a content, the integrity check value (ICV) is produced to correspond to the content, and the presence or absence of the falsification of the content is judged by computing ICV.

The integrity check value (ICV) is, for example, computed using a hash function with respect to the content, and is computed by ICV=hash (Kicv, C1, C2, . . . ). Kicv is an ICV producing key. C1, C2 are information of a content, and a message authentication code (MAC) of important information of the content is used.

Figure 18:
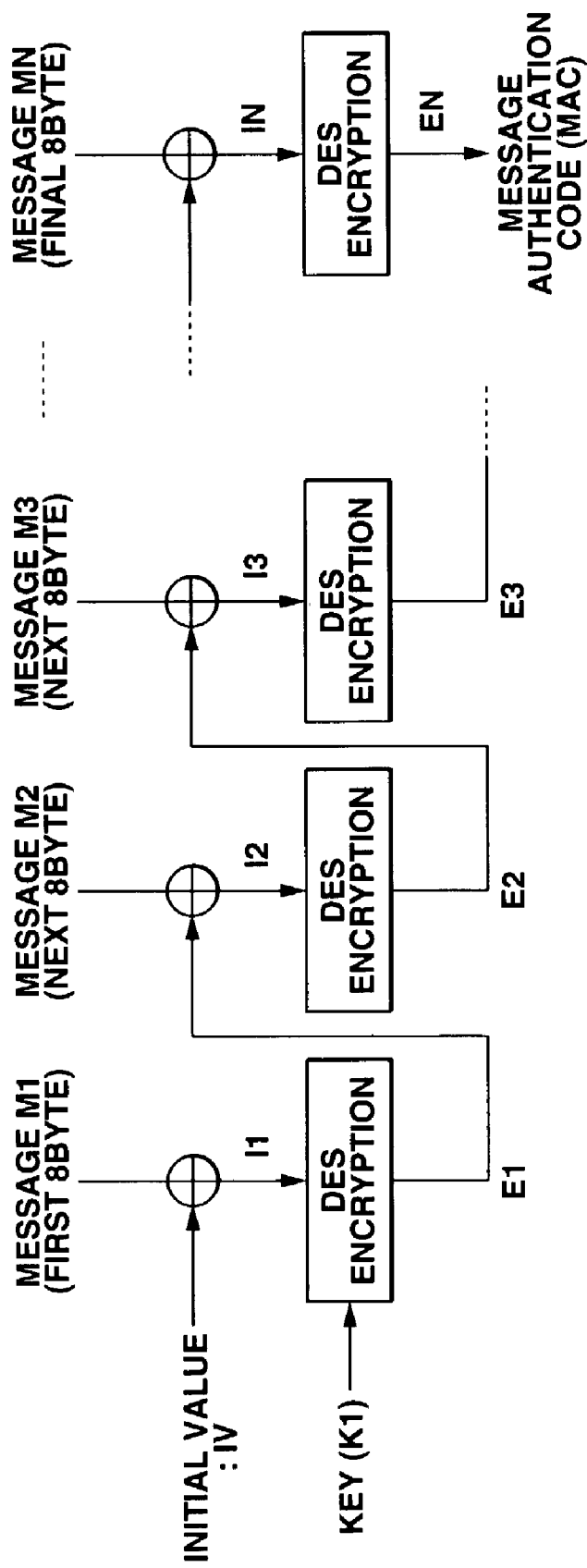
FIG. 18 is a view showing an example of MAC value production used in production of a content integrity check value (ICV) applicable in the present invention.

FIG. 18 shows a MAC value producing example using the DES encryption processing constitution. As shown in the constitution of FIG. 18, a message to be an object is divided into 8-bit units (hereinafter, the divided messages are M1, M2, . . . MN). First, the initial value (hereinafter, IV) and M1 are subjected to exclusive OR (result of which is I1). Next, I1 is put into a DES encryption part to carry out encrypting using a key (hereinafter, K1) (an output is E1). Continuously, E1 and M2 are subjected to exclusive OR, output I2 of which is put into the DES encryption part, and is encrypted using the key 1 (an output E2). Thereafter, this procedure is repeated, and the encrypting processing applied to all the messages. The last EN is a message authentication code (MAC).

The hash function is applied to the MAC value of the content and the ICV producing key to produce the integrity check value (ICV) of the content. ICV produced when a content is produced for which the fact that no falsification is present is assured is compared with ICV produced on the basis of a new content. If the same ICV is obtained, the fact that the content is not falsified is assured, and if ICV is different, judgment that falsification is present is made.

[Constitution for Distributing a Producing Key Kicv of the Check Value (ICV) by EKB]

Next, the constitution in which Kiec which is an integrity check value (ICV) producing key of a content is sent by the enabling key block will be described. That is, this is an example in which encrypted message data by EKB is an integrity check value (ICV) producing key of a content.

Figure 19:
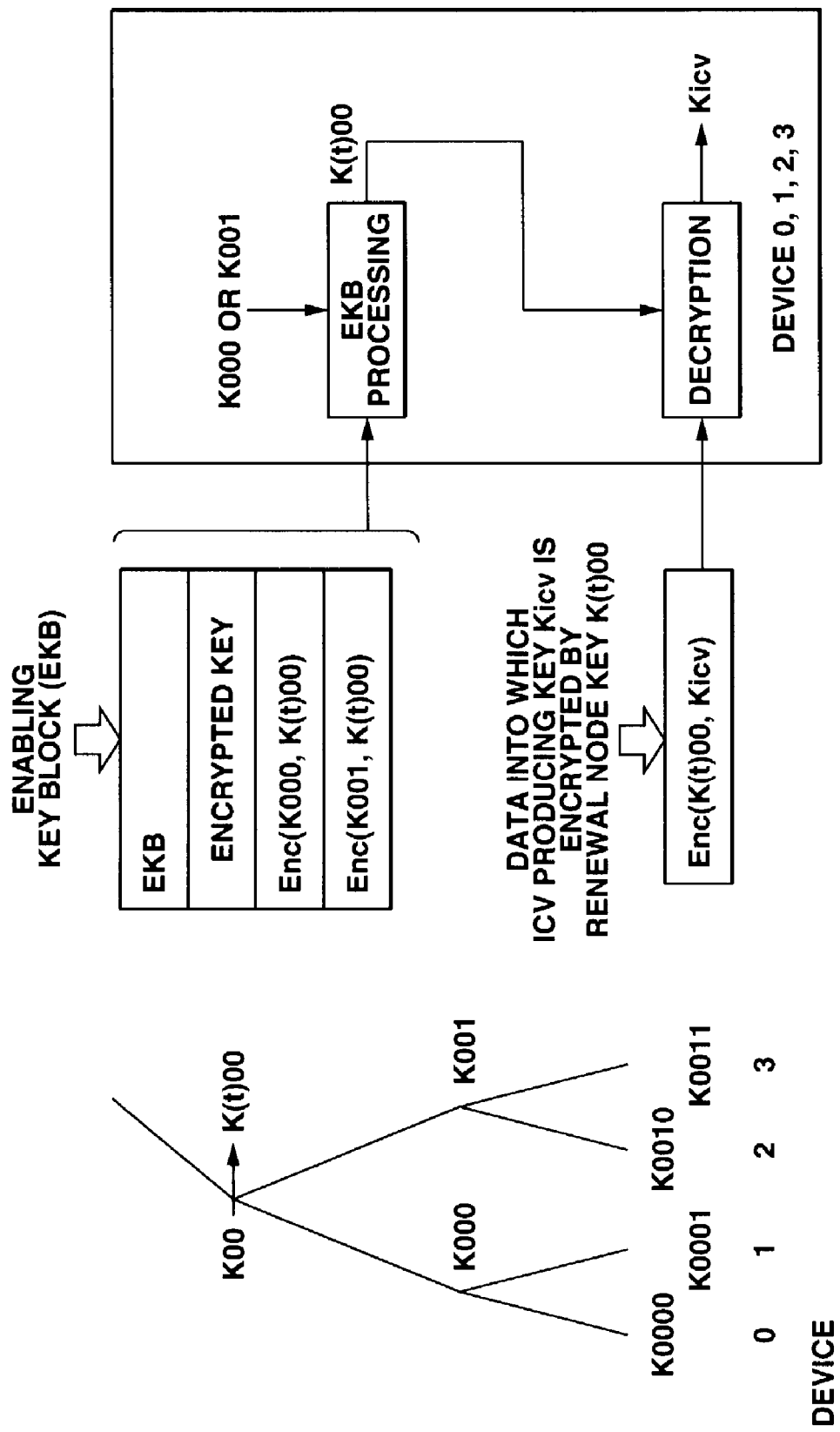
FIG. 19 is a view (1) showing a data constitution for distributing an enabling key block (EKB) and an ICV producing key, and an example of a processing in a device in the information processing system according to the present invention.
Figure 20:
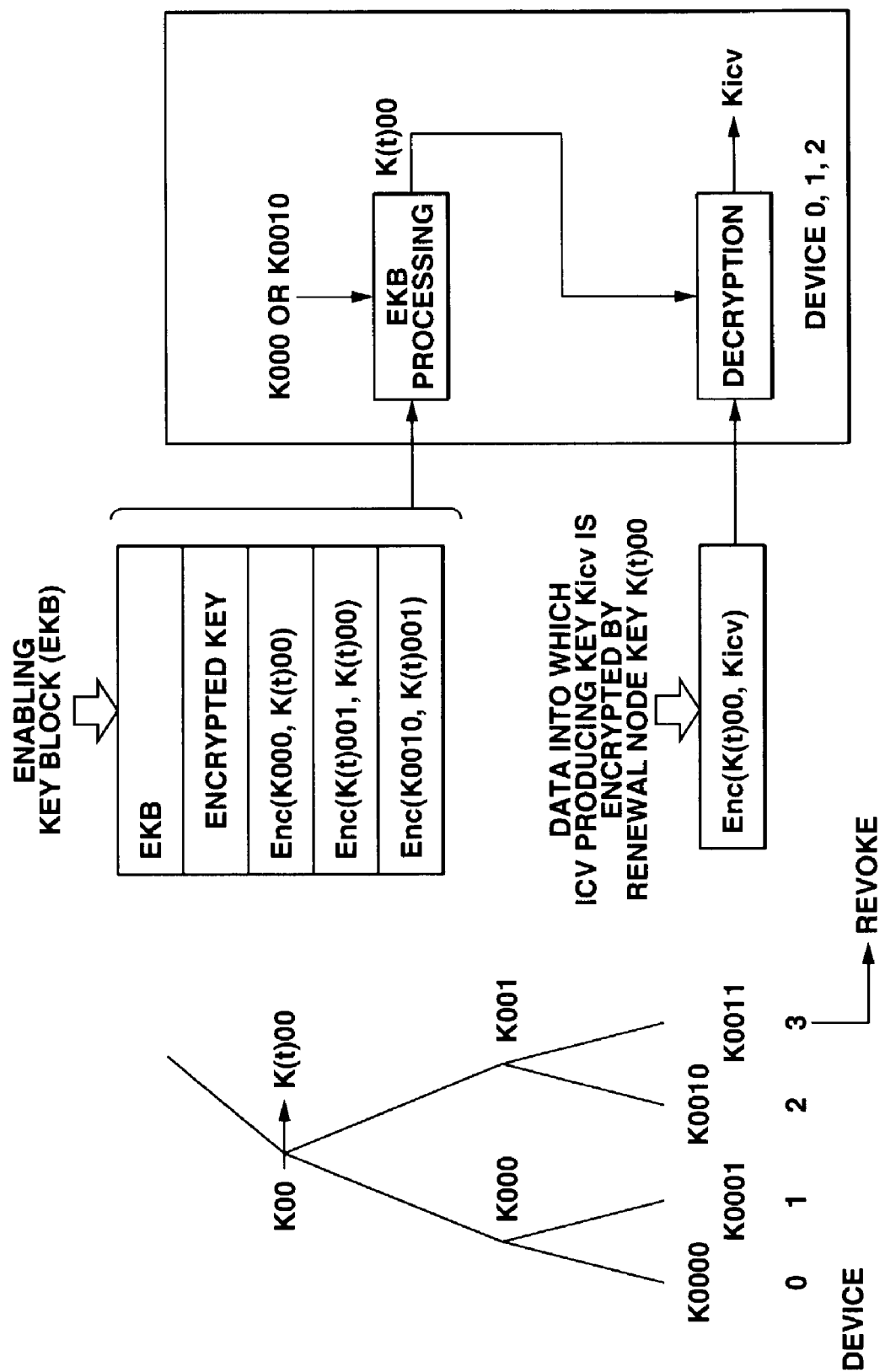
FIG. 20 is a view (2) showing a data constitution for distributing an enabling key block (EKB) and an ICV producing key, and an example of a processing in a device in the information processing system according to the present invention.

FIG. 19 and FIG. 20 show an example in which where contents common to a plurality of devices are sent, an integrity check value producing key Kicv for authenticating the presence or absence of falsification of these contents is distributed by the enabling key block (EKB). FIG. 19 shows an example in which a decodable integrity check value producing key Kicv is distributed to devices 0, 1, 2, 3, and FIG. 20 shows an example in which the device 3 out of the devices 0, 1, 2, 3 is revoked, and a decodable integrity check value producing key Kicv is distributed to only the devices 0, 1, 2.

In the example of FIG. 19, a node key K(t)00 renewed using a node key and a leaf key owned by the devices 0, 1, 2, 3 along with data (b) having a check value producing key Kicv encrypted by a renewal node key K(t)00 are distributed by producing a decodable enabling key block (EKB). As shown on the right side in FIG. 19, the respective devices first process (decrypts).EKB to thereby obtain a node key K(t)00 renewed, and subsequently decrypt a check value producing key: Enc(K(t)00, Kicv) encrypted using the obtained node key K(t)00 to obtain a check value producing key Kicv.

Since other devices 4, 5, 6, 7 . . . cannot obtain a node key K(t)00 renewed by processing EKB by a node key and a leaf key owned by itself even if the same enabling key block (EKB) is received, the check value producing key can be sent to only valid device safely.

On the other hand, the example of FIG. 20 is an example in which as the device is, for example, revoked by leak of a key, in a group surrounded by the dotted frame of FIG. 3 produces a decodable enabling key block (EKB) with respect to the only members of the other group, that is, the devices 0, 1, 2 for distribution. Data having (a) an enabling key block (EKB) and (b) a check value producing key (Kicv) shown in FIG. 20 encrypted by the node key (K(t)00) are distributed.

On the right side of FIG. 20, the decrypting procedure is shown. First, the devices 0, 1, 2 obtain a renewal node key (K(t)00) by decrypting process using a leaf key or a node key owned by itself from the received enabling key block. Next, the devices obtain a check value producing key Kicv by decrypting made by K(t)00.

The devices 4, 5, 6 . . . in the other group shown in FIG. 3 cannot obtain a renewal node key (K(t)00) using a leaf key and a node key owned by itself even if similar data (EKB) is received. Similarly, also in the device 3 revoked, the renewal node key (K(t)00) cannot be obtained by a leaf key and a node key owned by itself, and only the device having a valid right is able to decrypt an authentication key for use.

If distribution of a check value reproducing key making use of EKB is used, only the valid right holder is able to distribute a decodable check value producing key safely with less data quantity.

By using the integrity check value (ICV) of contents as described above, it is possible to eliminate invalid copies of EKB and encrypted contents. It is supposed that for example, as shown in FIGS. 21A and 21B, there is a medium 1 in which a content C1 and a content C2 are stored along with an enabling key block (EKB) capable of obtaining content keys, which is copied to a medium 2 without modification. It is possible to copy EKB and encrypted contents, which can be used in a device capable of decrypting EKB.

There is provided a constitution in which as shown in FIG. 21B, integrity check values (ICV (C1, C2)) are stored corresponding to contents properly stored in the respective media. The (ICV (C1, C2)) shows ICV=hash (Kicv, C1, C2) which is an integrity check value of contents computed using the hash function in the content C1 and the content C2. In the constitution of FIG. 21B, a content 1 and a content 2 are properly stored in the medium 1, and integrity check values (ICV (C1, C2)) produced on the basis of the content C1 and the content C2 are stored. Further, a content 1 is properly stored in the medium 2, and an integrity check values (ICV (C1)) produced on the basis of the content C1 is stored therein. In this constitution, Assume that (EKB, content 2) stored in the medium 1 is copied to the medium 2, when in the medium 2, a content check value is newly produced, ICV (C1, C2) are to be produced, so that it becomes obvious that different from Kicv (C1) stored in the medium, falsifying of contents and storing of new contents due to the invalid copy are executed. In the device for reproducing media, ICV checking is executed in the step previous to the reproducing step, and judgment is made of coincidence between the produced ICV and the stored ICV, if not coincident, the constitution in which reproducing is not executed is provided to enable prevention of reproducing contents copied invalidly.

Furthermore, there can be provided the constitution in which for enhancing safety, the integrity check value (ICV) of contents is rewritten to produce them on the basis of data including a counter. That is, this constitution is to make computation by ICV=hash (Kicv, counter+1, C1, C2, . . . ). Here, a counter (counter+1) is set as a value in which one increment is made every rewriting. It is necessary to have a constitution in which a counter value is stored in a secure memory.

Further, in the constitution in which the integrity check value (ICV) of contents is cannot be stored in the same medium as contents, the integrity check value (ICV) of contents is stored in a separate medium.

For example, where contents are stored in media which take no measures to prevent copies such as a read only memory or normal MO, there is the possibility that when the integrity check value (ICV) is stored in the same medium, rewriting of the ICV is done by an invalid user, failing to maintain the safety of ICV. In such a case, there can be provided the constitution in which ICV is stored in a safety medium on a host machine, and ICV is used for copy control (for example, check-in/check-out, move), to thereby enable safe management of ICV and checking of falsification of contents.

Figure 22:
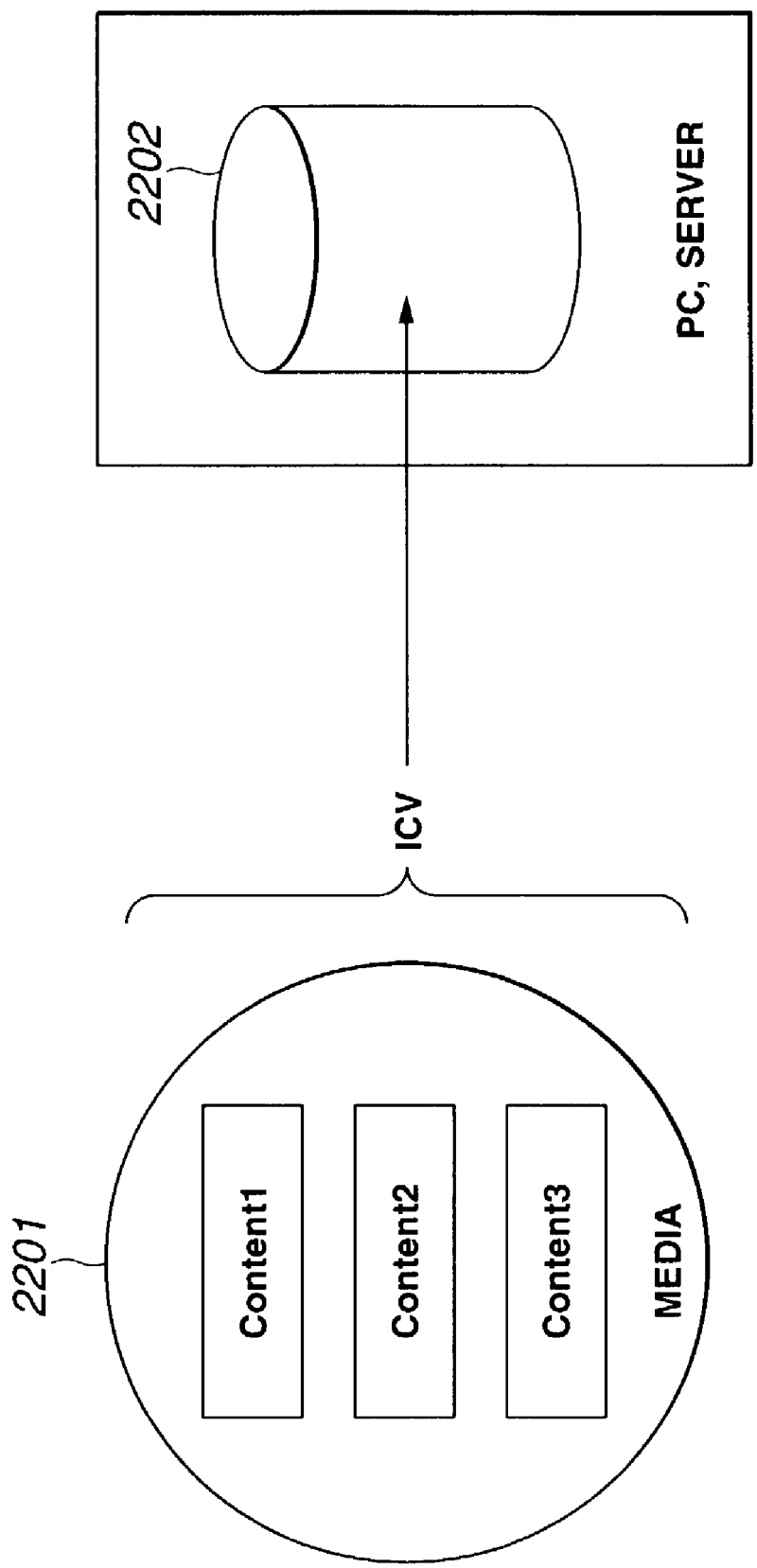
FIG. 22 is a view for explaining a constitution for controlling an applicable content integrity check value (ICV) separately from a content storage medium in the present invention.

The above constitution is shown in FIG. 22. In FIG. 22, contents are stored in a medium 2201 which takes no measures for preventing copying such as read only media or normal MO, and the integrity check values (ICV) in connection with these contents are stored in a safe media 2202 on a host machine to which a user is not allowed to get access to prevent invalid rewriting of the integrity check value (ICV) by a user. If, as such a constitution as described above, for example, employment is made of a constitution in which when a device on which a media 2201 is mounted executes reproducing of the media 2201, a PC or a server which is a host machine executes checking of ICV to judge the propriety of reproducing, reproducing of invalid copy contents or falsified contents can be prevented.

[Category Classification of a Hierarchical Tree Structure]

A description has been made of the constitution in which an encrypted key is constituted as a hierarchical tree structure shown in FIG. 3 such as a root key, a node key, a leaf key, etc., and a content key, an authentication key, an ICV producing key or a program code, data or the like are encrypted along with an enabling key block and distributed, but a description will be made hereinafter of the constitution in which a hierarchical tree structure which defines a node key or the like is classified every category of devices to execute efficient key renewing process, encrypted key distribution, and data distribution.

Figure 23:
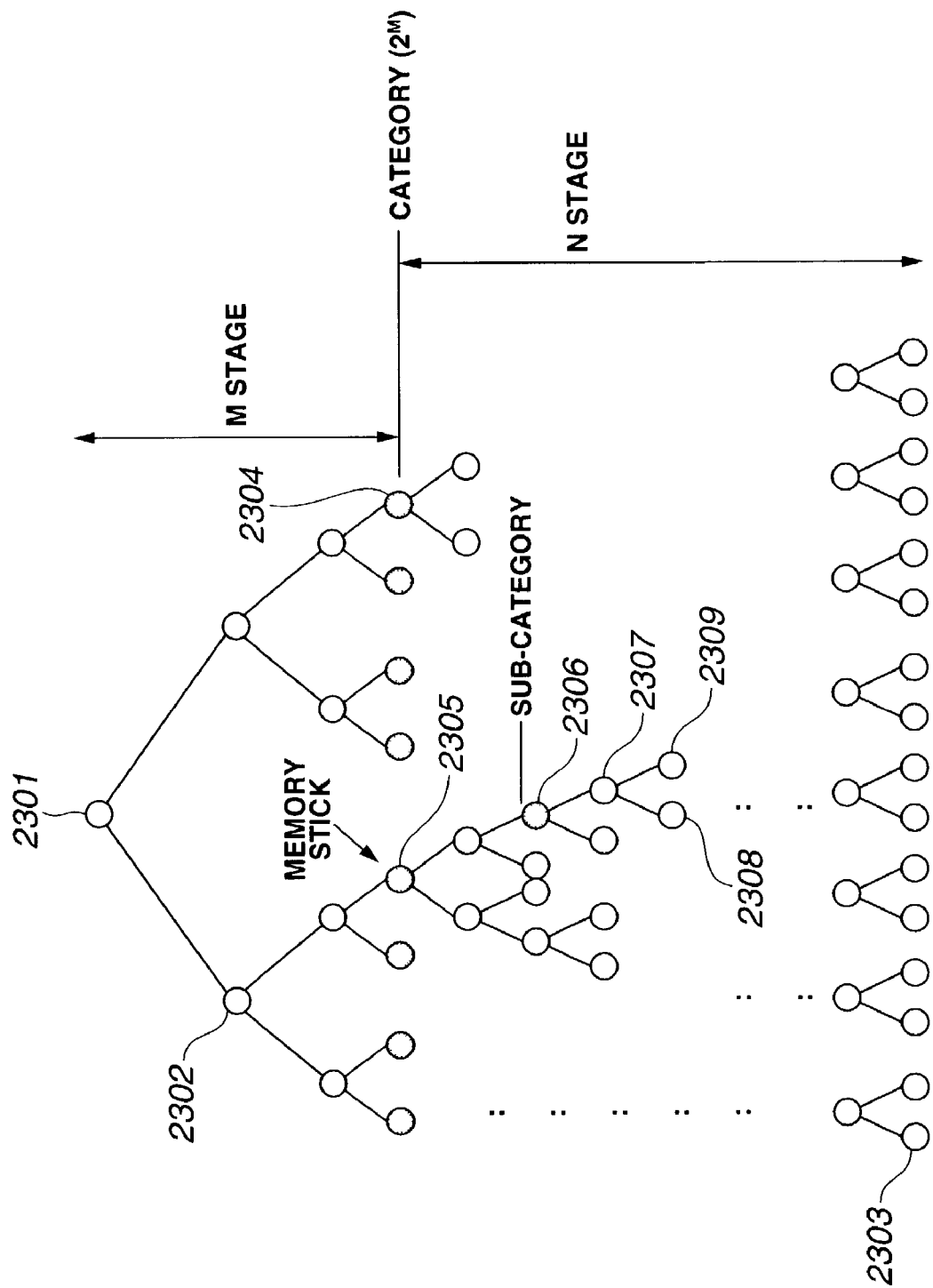
FIG. 23 is a view for explaining an example of category classification of a hierarchical tree structure in the information processing system of the present invention.

FIG. 23 shows one example of classification of category of a hierarchical tree structure. In FIG. 23, a root key Kroot 2301 is set on the uppermost stage of the hierarchical tree structure, a node key 2302 is set in the intermediate stage, and a leaf key 2303 is set in the lowest stage. Each device holds individual leaf keys, and a series of node keys from a leaf key to a root key, and a root key.

Here, as one example, nodes from the uppermost stage to the M stage is set as a category node 2304. That is, each of nodes on the M stage is set as a device setting node of a specific category. Nodes and leaves lower than the M+1 stage are taken as nodes and leaves in connection with devices contained in the category thereof with one node in the M stage as a top.

For example, a category [Memory stick (trademark)] is set to one node 2305 in the M stage of FIG. 23, and nodes and leaves provided lower than the node 2305 are set as category-exclusive use nodes or leaves containing various devices using the memory stick. That is, those below the node 2305 are defined as the gathering of nodes and leaves associated with device defined in the category of the memory stick.

Further, a stage at a level below several stages from the M stage can be set as a sub-category node 2306. For example, a node of [Reproducing exclusive-use unit] is set as a sub-category node contained in the category of the device using the memory stick in a node two stages below a category [memory stick] node 2305 as shown in the figure. Further, a node 2307 of a telephone with a music reproducing function contained in the category of the reproducing exclusive-use unit below the node 2306 of the reproducing exclusive-use unit as a sub-category node, and a [PHS] node 2308 and a [Portable telephone] node 2309 contained in the category of the telephone with a music reproducing function can be set therebelow.

Further, the category and sub-categories can be set not only at the kind of devices, but also at nodes managed independently, for example, makers, a content provider, a settlement organization or the like, that is, at suitable units such as processing unit, jurisdiction unit, or service providing unit (these will be generally called entity). For example, if one category node is set as a game machine XYZ exclusive-use top node sold by game machine makers, a node key and a leaf key in the lower stage below the top node can be stored in the game machine XYZ sold by makers for sales, after which distribution of encrypted contents, or distribution of various keys, and renewal processing are distributed producing an enabling key block (EKB) constituted by node keys and leaf keys below the top node key, and data that can be utilized merely for the devices below the top node can be distributed.

The constitution can be provided in which the node below one node as a top is set as an associated node of the category or sub-categories defined, whereby makers, a content provider or the controlling one top node in the category stage or sub-category stage independently produces an enabling key block with the node as a top to distribute it to the devices belonging to those below the top node, and key renewing can be executed without affecting at all on the devices belonging to the nodes of other categories not belonging to the top node.

The present invention has been described in detail with reference to the specific embodiments. However, it is obvious that those skilled in art may amend or replace the embodiments within the scope not departing from the subject matter of the present invention. That is, the present invention has been disclosed in the form of illustration and should not be interpreted imitatively. For judging the subject matter of the present invention, reference should be made to the claims described herein after.

INDUSTRIAL APPLICABILITY

As described above, according to the information processing system and method according to the present invention, as a content key, an authentication key, a content check value producing key, a program data or the like are transmitted with an enabling key block (EKB) in an encryption key constitution of a tree structure, an encryption data distribution in which only valid devices can perform decryption can be realized, and the distributing message quantity can be suppressed as small as possible.

Also, if authentication processing in a common key system or a public key system is jointly used in a constitution for transmitting a content key, an authentication key, a content check value producing key, a program data or the like with an enabling key block (EKB) using an encrypted key and data distributing system of a tree structure, safer data distribution can be achieved.

Also, according to the information processing system and method according to the present invention, an integrity check value (ICV) of the content is stored in a recording medium having stored contents or another media to enable to check falsification of contents or copying. Thus, it is possible to prevent fraudulent distribution of contents.

Further, according to the information processing system and method according to the present invention, as a hierarchical tree is classified by each category, and nodes and leaves under a top node managed by each category are limited to specific devices, the manager of each category can independently generate an enabling key block (EKB) and distribute it to devices under control.

The invention claimed is:

1. An information processing system for distributing encrypted message data, said system comprising:
   a receiving device, including:
      holding means for holding a key set that is specific to said receiving device and which includes a portion of a plurality of node keys and a corresponding leaf key, the plurality of node keys being associated with a plurality of nodes whereby a given one of the plurality of node keys is associated with a particular one of the plurality of nodes, the plurality of nodes being arranged according to a hierarchical tree structure having a root node and a plurality of leaves, the portion of the plurality of node keys being the node keys associated with the nodes disposed along a particular path from the root node of the hierarchical tree structure to a particular one of the plurality of leaves that is associated with said receiving device and with its corresponding leaf key, and encryption processing means for decrypting encrypted message data distributed to said receiving device by using the key set; and a distributing device, including:

message data generating means for generating an enabling key block (EKB) using one or more keys selected from the group consisting of the portion of the plurality of node keys and the corresponding leaf key, and message data distributing means for distributing a storage medium storing first message data that includes data in which first content is encrypted with a first content key, data in which the first content key is encrypted by a content key encryption key, and a link to a location on the storage medium wherein data is stored in which the content key encryption key is encrypted by the enabling key block (EKB), and storing second message data that includes data in which second content is encrypted by a second content key, data in which the second content key is encrypted by the content key encryption key, and another link to the location on the storage medium wherein the data is stored in which the content key encryption key is encrypted by the enabling key block (EKB).

2. The information processing system according to claim 1, wherein said encryption processing means of said receiving device obtains a renewal node key by decrypting the enabling key block (EKB).

3. The information processing system according to claim 1, wherein at least one of the first message data and the second message data includes an authentication key used in authentication processing.

4. The information processing system according to claim 1, wherein at least one of the first message data and the second message data includes a key for generating an integrity check value (ICV) of its content.

5. The information processing system according to claim 1, wherein at least one of the first message data and the second message data includes a program code.

6. The information processing system according to claim 1, wherein said message data distributing means and said receiving device each include associated authentication processing means for executing authentication processing, and a distribution of said message data is performed on the condition that the authentication processing between said message data distributing means and said receiving device has been completed.

7. The information processing system according to claim 1, wherein an intermediate device is disposed between said message data distributing means and said receiving device, and said message data distributing means generates and distributes enabling key block (EKB) data and encrypted first and second message data that can be decrypted only in target devices targeted for distributing said message data.

8. The information processing system according to claim 1, wherein a same encryption key is used for both the first content key and the second content key.

9. The information processing system according to claim 1, wherein the hierarchical tree structure includes a category group that includes only the nodes and leaves which are subordinate to a further one of the plurality of nodes; wherein the category group is associated with a set of devices that belong to a category defined by a kind of device, a kind of a service or a kind of a managing means.

10. The information processing system according to claim 9, wherein the category group further includes one or more sub-category groups in the hierarchical tree structure;

wherein the sub-category group is associated with a sub-set of devices that belong to a category defined by another kind of device, kind of a service, or kind of a managing means.

11. An information processing method for distributing encrypted message data, said method comprising:

generating a plurality of node keys, the plurality of node keys being associated with a plurality of nodes whereby a given one of the plurality of node keys is associated with a particular one of the plurality of nodes, the plurality of nodes being arranged according to a hierarchical tree structure having a root node and a plurality of leaves, the plurality of leaves being associated with a plurality of leaf keys and with a plurality of devices whereby a given one of the plurality of leaves is associated with a specific one of the plurality of leaf keys and with a particular one of the plurality of devices;

generating an enabling key block (EKB) using one or more keys selected from the group consisting of the plurality of node keys and the plurality of leaf keys;

distributing a storage medium storing first message data that includes data in which first content is encrypted by a first content key, data in which the first content key is encrypted by a content key encryption key, and a link to a location on the storage medium wherein data is stored in which the content key encryption key is encrypted by the enabling key block (EKB), and storing second message data that includes data in which second content is encrypted by a second content key, data in which the second content key is encrypted by the content key encryption key, and another link to the location on the storage medium wherein the data is stored in which the content key encryption key is encrypted by the enabling key block (EKB), the content key encryption key being the renewal node key; and decrypting, at a given one of the plurality of different devices, the encrypted first message data using an associated key set that is specific to and stored in that device and using the data in which the content key encryption key is encrypted by the enabling key block (EKB), the associated key set including a specific portion of the plurality of node keys that are associated with the nodes disposed along a particular path from the root node of the hierarchical tree structure to a particular one of the plurality of leaves that is associated with that device and including the leaf key associated with that device so that the key set associated with a given one of the plurality of devices is different than the key set associated with another one of the plurality of devices.

12. The information processing method according to claim 11, wherein said decrypting step includes a renewal node key obtaining step of obtaining a renewal node key by decrypting the enabling key block (EKB), and a message data decrypting step for executing decryption of the encrypted first message data using the renewal node key.

13. The information processing method according to claim 11, wherein at least one of the first message data and the second message data includes an authentication key used in the authentication processing.

14. The information processing method according to claim 11, wherein at least one of the first message data and the second message data includes a key for generating an integrity check value (ICV) of its content.

15. The information processing method according to claim 11, wherein at least one of the first message data and the second message data includes a program code.

16. The information processing method according to claim 11, further comprising an authentication processing step for executing authentication processing, and
wherein said message data distributing step is performed on the condition that said authentication processing step has been completed.

17. The information processing method according to claim 11, wherein said message data distributing step generates and distributes enabling key block (EKB data and encrypted first and second message data that can be decrypted only in a target device targeted for receiving said message data.

18. The information processing method according to claim 11, wherein a same encryption key is used for both the first content key and the second content key.

19. An information recording medium that is readable by an information processing system and having stored therein data, said data comprising:
a plurality of node keys, the plurality of node keys being associated with a plurality of nodes whereby a given one of the plurality of node keys is associated with a particular one of the plurality of nodes, the plurality of nodes being arranged according to a hierarchical tree structure having a root node and a plurality of leaves, the plurality of leaves being associated with a plurality of leaf keys and with a plurality of devices whereby a given one of the plurality of leaves is associated with a specific one of the plurality of leaf keys and with a particular one of the plurality of devices;
an enabling key block (EKB) which is encrypted using one or more keys selected from the group consisting of the plurality of node keys and the plurality of leaf keys;
first message data that includes data in which first content is encrypted with a first content key, data in which the first content key is encrypted by a content key encryption key, and a link to a location on said information recording medium wherein data is stored in which the content key encryption key is encrypted by the enabling key block (EKB) so that when the information processing system processes the first content, the information processing system decrypts the EKB using one or more keys selected from the group consisting of the plurality of node keys and the plurality of leaf keys, decrypts the data in which the content key encryption key is encrypted using the EKB, decrypts the data in which the first content key is encrypted using the content key encryption key, and decrypts the data in which the first content is encrypted using the first content key; and
second message data that includes data in which second content is encrypted by a second content key, data in which the second content key is encrypted by the content key encryption key, and another link to the location on said information recording medium wherein the data is stored in which the content key encryption key is encrypted by the enabling key block (EKB) so that when the information processing system processes the second content, the information processing system decrypts the EKB using one or more keys selected from the group consisting of the plurality of node keys and the plurality of leaf keys, decrypts the data in which the content key encryption key is encrypted using the EKBE, decrypts the data in which the second content key is encrypted using the content key encryption key, and decrypts the data in which the second content is encrypted using the second content key.

20. The information recording medium according to claim 19 wherein said information recording medium stores an integrity check value (ICV) of at least one of the first content and the second content.

21. The information recording medium according to claim 19, wherein a same encryption key is used for both the first content key and the second content key.

22. A computer-readable medium for storing instructions for carrying out a method of decrypting encrypted content, said method comprising:
obtaining a storage medium storing first message data that includes data in which first content is encrypted by a first content key, data in which the first content key is encrypted by a content key encryption key, and a link to a location on the storage medium wherein data is stored in which the content key encryption key is encrypted by the enabling key block (EKB), and storing second message data that includes data in which second content is encrypted by a second content key, data in which the second content key is encrypted by the content key encryption key, and another link to the location on the storage medium wherein the data is stored in which the content key encryption key is encrypted by the enabling key block (EKB);
obtaining an enabling key block (EKB) using at least one or more keys selected from the group consisting of a plurality of node keys and a plurality of leaf keys, the plurality of node keys being associated with a plurality of nodes whereby a given one of a plurality of node keys is associated with a particular one of the plurality of nodes, the plurality of leaf keys being associated with a plurality of leaves whereby a given one of the plurality of leaf keys is associated with a specific one of the plurality of leaves, the plurality of nodes being arranged according to a hierarchical tree structure having a root node and the plurality of leaves, at least one of the plurality of node keys being renewable using the renewal node key;
decrypting, using the enabling key block, the data in which the content key encryption key is encrypted;
decrypting, using the content key encryption key, the data in which content key is encrypted; and decrypting the at least one of the encrypted first content using the content key.

23. The computer-readable medium according to claim 22, wherein a same encryption key is used for both the first content key and the second content key.

24. An information processing method for distributing encrypted message data, said method comprising:
generating a plurality of node keys, the plurality of node keys being associated with a plurality of nodes whereby a given one of the plurality of node keys is associated with a particular one of the plurality of nodes, the plurality of nodes being arranged according to a hierarchical tree structure having a root node and a plurality of leaves, the plurality of leaves being associated with a plurality of leaf keys and with a plurality of devices whereby a given one of the plurality of leaves is associated with a specific one of the plurality of leaf keys and with a particular one of the plurality of devices;
generating an enabling key block (EKB) using one or more keys selected from the group consisting of the plurality of node keys and the plurality of leaf keys; and generating a storage medium storing first message data that includes data in which first content is encrypted by a first content key, data in which the first content key is encrypted by a content key encryption key, and a link to a location on the storage medium wherein data is stored in which the content key encryption key is encrypted by the enabling key block (EKB), and storing second message data that includes data in which second content is encrypted by a second content key, data in which the second content key is encrypted by the content key encryption key, and another link to the location on the storage medium wherein the data is stored in which the content key encryption key is encrypted by the enabling key block (EKB), to distribute the first message data and the second message data to a plurality of devices.

25. The information processing method according to claim 24, wherein at least one of the first message data and the second message data includes an authentication key used in authentication processing.

26. The information processing method according to claim 24, wherein at least one of the first message data and the second message data includes a key for generating an integrity check value (ICV) of contents.

27. The information processing method according to claim 24, wherein a same encryption key is used for both the first content key and the second content key.

28. An information processing method, comprising:
obtaining a storage medium storing first message data that includes data in which first content is encrypted by a first content key, data in which the first content key is encrypted by a content key encryption key, and a link to a location on the storage medium wherein data is stored in which the content key encryption key is encrypted by the enabling key block (EKB), and storing second message data that includes data in which second content is encrypted by a second content key, data in which the second content key is encrypted by the content key encryption key, and another link to the location on the storage medium wherein the data is stored in which the content key encryption key is encrypted by the enabling key block (EKB);

obtaining the enabling key block (EKB) using at least one or more keys selected from the group consisting of a plurality of node keys and a plurality of leaf keys, the plurality of node keys being associated with a plurality of nodes whereby a given one of a plurality of node keys is associated with a particular one of the plurality of nodes, the plurality of leaf keys being associated with a plurality of leaves whereby a given one of the plurality of leaf keys is associated with a specific one of the plurality of leaves, the plurality of nodes being arranged according to a hierarchical tree structure having a root node and the plurality of leaves, at least one of the plurality of node keys being renewable using the renewal node key;

decrypting, using the enabling key block (EKB), the data in which the content key encryption key is encrypted;

decrypting, using the content key encryption key, the data in which content key is encrypted; and decrypting the encrypted first content using the content key.

29. The information processing method according to claim 28, wherein a same encryption key is used for both the first content key and the second content key.

* * * * *